(12) United States Patent
Iwasaki

(10) Patent No.: US 8,267,566 B2
(45) Date of Patent: Sep. 18, 2012

(54) PLANAR LIGHTING DEVICE

(75) Inventor: Osamu Iwasaki, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 383 days.

(21) Appl. No.: 12/568,535

(22) Filed: Sep. 28, 2009

(65) Prior Publication Data

US 2010/0080019 A1 Apr. 1, 2010

(30) Foreign Application Priority Data

Sep. 29, 2008 (JP) ................................ 2008-250359

(51) Int. Cl.
*F21V 7/04* (2006.01)
(52) U.S. Cl. ........ 362/632; 362/608; 362/609; 362/611; 362/612; 362/613; 362/615; 362/628; 362/634
(58) Field of Classification Search ........................ None
See application file for complete search history.

(56) References Cited

U.S. PATENT DOCUMENTS

| | | | |
|---|---|---|---|
| 5,966,192 A | 10/1999 | Higuchi et al. | |
| 5,993,020 A | 11/1999 | Koike | |
| 6,175,396 B1 * | 1/2001 | Kim et al. | 349/58 |
| 6,217,184 B1 | 4/2001 | Koike et al. | |
| 6,545,732 B2 * | 4/2003 | Nakano | 349/58 |
| 2007/0165422 A1 | 7/2007 | Iwasaki | |
| 2009/0086505 A1 * | 4/2009 | Iwasaki et al. | 362/612 |

FOREIGN PATENT DOCUMENTS

| | | |
|---|---|---|
| JP | 7-36037 A | 2/1995 |
| JP | 8-248233 A | 9/1996 |
| JP | 8-271739 A | 10/1996 |
| JP | 11-153963 A | 6/1999 |
| JP | 2002-203418 A | 7/2002 |
| JP | 2003-90919 A | 3/2003 |
| JP | 2004-171948 A | 6/2004 |
| JP | 2005-108676 A | 4/2005 |
| JP | 2005-234397 A | 9/2005 |
| JP | 2005-302322 A | 10/2005 |
| JP | 2008-147043 A | 6/2008 |
| JP | 2008-198481 A | 8/2008 |
| WO | 2008/062695 A1 | 5/2008 |

OTHER PUBLICATIONS

Notification of Reasons for Refusal, dated Jul. 10, 2012, issued in corresponding JP Application No. 2008-250359, 5 pages in English and Japanese.

* cited by examiner

*Primary Examiner* — Diane Lee
*Assistant Examiner* — Sean Gramling
(74) *Attorney, Agent, or Firm* — Sughrue Mion, PLLC

(57) ABSTRACT

A planar lighting device comprises: a light guide plate including a concave rectangular light exit plane, two light entrance planes containing two opposite sides of the light exit plane and disposed opposite each other, two symmetrical inclined planes opposing to the light exit plane such that their distance from the light exit plane increases with the increasing distance from the two light entrance planes toward the center of the light exit plane, a curved portion connecting the two inclined planes; two light sources respectively disposed opposite the two light entrance planes for emitting light to enter the light into the light guide plate through the light entrance planes; and sliding mechanisms allowing the light sources to slide in a direction parallel to the light entrance planes of the light guide plate to absorb the expansion and contraction of the light sources along the length thereof.

6 Claims, 15 Drawing Sheets

EFFECTS OF GREASE WITH 52"-SCREEN LIGHT GUIDE PLATE
(FRONT BRIGHTNESS AND TEMPERTURE OF UPPER LED BASE)

PLANAR LIGHTING DEVICE

The entire contents of literature cited in this specification are incorporated herein by reference.

BACKGROUND OF THE INVENTION

The present invention relates to a planar lighting device used for a liquid crystal display device and the like.

Liquid crystal display devices use a backlight unit for radiating light from behind the liquid crystal display panel to illuminate the liquid crystal display panel. A backlight unit is configured using a light guide plate for diffusing light emitted by an illuminating light source to irradiate the liquid crystal display panel and optical parts such as a prism sheet or a diffusion sheet for rendering the light emitted from the light guide plate uniform.

Currently, large liquid crystal televisions predominantly use a so-called direct illumination type backlight unit comprising a light guide plate disposed immediately above the illuminating light source. This type of backlight unit comprises a plurality of cold cathode tubes serving as a light source provided behind the liquid crystal display panel whereas the inside of the backlight unit provides white reflection surfaces to ensure uniform light amount distribution and necessary brightness.

To achieve a uniform light amount distribution with a direct illumination type backlight unit, however, a thickness of about 30 mm in a direction perpendicular to the liquid crystal display panel is required, making further reduction of thickness difficult with the direct illumination type backlight unit.

Among backlight units that allow reduction of thickness thereof is a backlight unit using a light guide plate whereby light emitted by illumination light sources and admitted into the light guide plate is guided in given directions and emitted through a light exit plane that is different from the plane through which light is admitted.

There has been proposed a backlight of a type described above using a light guide plate formed by mixing scattering particles for diffusing light into a transparent resin, as follows:

JP 07-36037 A, for example, discloses a light diffusion/guide type light source device comprising a light diffusion/guide member having at least one light entrance plane region and at least one light exit plane region and light source means for admitting light through the light entrance plane region, the light diffusion/guide member having a region that has a tendency to decrease in thickness with the increasing distance from the light entrance plane.

JP 08-248233 A discloses a planar light source device comprising a light diffusion/guide member, a prism sheet provided on the side of the light diffusion/guide member closer to a light exit plane, and a reflector provided on the rear side of the light diffusion/guide member. JP 08-271739 A discloses a liquid crystal display comprising a light emission direction correcting element formed of a sheet optical member provided with a light entrance plane having a repeated undulate pattern of prism arrays and a light exit plane given a light diffusing property. JP 11-153963 A discloses a light source device comprising a light diffusion/guide member having a scattering property therein and light supply means for supplying light through an end face of the light diffusion/guide member.

Also proposed in addition to the above light guide plates are a light guide plate having a greater thickness at the center thereof than at an end thereof at which light is admitted and the opposite end, a light guide plate having a reflection plane inclined in such a direction that the thickness of the light guide plate increases with the increasing distance from a part of the light guide plate at which light is admitted, and a light guide plate having a configuration such that a thickness thereof is minimum at a light entrance portion and is greatest at a greatest distance from the light entrance portion (See, for example, JP 2003-90919 A, JP 2004-171948 A, JP 2005-108676 A, and JP 2005-302322 A).

While a thin design may be achieved with backlight units such as the tandem type, of which the thickness decreases with the increasing distance from the light source, those backlight units yielded lower light use efficiency than the direct illumination type because of the relative dimensions of the cold cathode tube to the reflector. Further, where a light guide plate used is shaped to have grooves for receiving cold cathode tubes, although such a light guide plate could be shaped to have a thickness that decreases with the increasing distance from the cold cathode tubes, if the light guide plate is made thinner, brightness at locations immediately above the cold cathode tubes disposed in the grooves increased, thus causing uneven brightness on the light exit plane to stand out. In addition, all these light guide plates posed further problems: complex configurations leading to increased machining costs. Thus, a light guide plate of any of such types adapted to be used for a backlight unit for a large liquid crystal television having a screen size of say 37 inches or larger, in particular 50 inches or larger, was considerably expensive.

In each light guide plate proposed in JP 2003-90919 A, JP 2004-171948 A, JP 2005-108676 A, and JP 2005-302322, a thickness of the light guide section grows greater with the increasing distance from the light entrance plane in order to achieve stabler manufacturing or to suppress brightness unevenness (unevenness in light amount) using multiple reflection. Each of these light guide plates, however, is made of a transparent material, and allows light admitted from the light source to pass and leak through the opposite end and therefore need to be provided with prisms or dot patterns on the surface thereof.

Also proposed is a method whereby the light guide plate is provided with a reflection member on the opposite side to the light entrance plane to cause admitted light to undergo multiple reflection before allowing the light to exit through the light exit plane. To achieve a large light exit plane with the light guide plate by this method, however, the light guide plate needs to have an increased thickness, increasing weight and costs. Further, the light sources are projected into the light guide plate and perceived as such to cause uneven brightness.

On the other hand, the side light type backlight unit using a flat light guide plate contains fine scattering particles dispersed therein in order to efficiently emit admitted light through the light exit plane. Although such a flat light guide plate may be capable of securing a light use efficiency of 83% at a particle density of 0.30 wt %, its brightness becomes dropped in an area about the center of the light guide exit plane as illustrated by the illuminance distribution indicated by a solid line in FIG. 19 when it was adapted to provide a larger screen despite scattering particles evenly dispersed therein, thus allowing uneven brightness to stand out to a visible level.

To even out such uneven brightness, the density of the scattering particles needed to be reduced in order to increase the amount of light leaking from the forward end, thus reducing the light use efficiency and the brightness. For example, when the density of the scattering particles was 0.10 wt %, with the other conditions being equal, the brightness decreased and the light use efficiency lowered to 43%, although uneven brightness could be evened out considerably, as illustrated by a dotted line in FIG. 19.

A large display such as a large liquid crystal television requires a brightness distribution that is bright at a central area of the screen as compared with the periphery thereof, or a high-in-the-middle distribution such as a distribution representing a bell curve on the light exit plane. Although a flat light guide plate containing scattering particles dispersed therein may be capable of providing a flat brightness distribution by reducing the density of the scattering particles, it is incapable of achieving a high-in-the-middle brightness distribution.

It has also been proposed to use a light guide plate having a thickness that, conversely to the tandem type, increases with the increasing distance from the light source for a thin backlight unit. Although use of such a light guide plate does achieve a thinner design and a flat brightness over the whole screen, such a proposal did not provide any teaching or did not give the slightest consideration as to how one may achieve a high-in-the-middle brightness distribution whereby an area close to the center of the screen is brighter than the periphery thereof as required of thin, large-screen liquid crystal televisions.

Further, a large light guide plate expands and contracts greatly in response to ambient temperature and humidity changes; a light guide plate measuring about 50 inches, for example, repeats expansion and contraction of 5 mm or more. In worst cases, an expanded or contracted light guide plate pushes up the liquid crystal display panel, causing uneven brightness comparable in appearance to a pool. To avoid this, one might consider providing a great distance between the liquid crystal display panel and the backlight unit. This approach, however, makes it impossible to design a thinner liquid crystal display device.

SUMMARY OF THE INVENTION

It is an object of the invention to provide a light guide plate that solves the problems associated with the prior art mentioned above and which has a large and thin configuration, yields a high light use efficiency, emits light with minimized unevenness in brightness, and achieves a brightness distribution representing a high-in-the-middle curve or a bell curve, whereby an area close to the center of the screen is brighter than the periphery thereof.

More specifically, an object of the present invention is to provide a planar lighting device comprising a light guide plate including a rectangular light exit plane having an inwardly curved surface, two light entrance planes containing two opposite longer sides of the light exit plane and disposed opposite each other, and symmetrical reflection planes having a shape such that their distance from the light exit plane increases with the increasing distance from the two light entrance planes toward the center of the light exit plane, the light guide plate containing light scattering particles for scattering the light that propagates inside the light guide plate (which will be also referred to as "meniscus type light guide plate" in the description to follow), wherein the light guide plate can be prevented from deforming and bulging toward the liquid crystal display panel as the light guide plate expands and contracts.

A planar lighting device according to the invention comprises:

a light guide plate including a concave rectangular light exit plane, two light entrance planes containing two opposite sides of the light exit plane and disposed opposite each other, two symmetrical inclined planes opposing to the light exit plane such that their distance from the light exit plane increases with the increasing distance from the two light entrance planes toward the center of the light exit plane, a curved portion connecting the two inclined planes, and light scattering particles for scattering light that propagates inside the light guide plate;

two light sources respectively disposed opposite the two light entrance planes for emitting light to enter the light into the light guide plate through the light entrance planes;

holder means for supporting and integrating each light source and the light guide plate while keeping their mutual distance constant;

a housing for accommodating the light sources and the light guide plate integrated by the holder means; and sliding mechanisms allowing the light sources to slide in a direction parallel to the light entrance planes of the light guide plate to absorb the expansion and contraction of the light sources along the length thereof.

DETAILED DESCRIPTION OF THE INVENTION

The planar lighting device of the invention will be described in detail below referring to an embodiment illustrated in the accompanying drawings.

While planar lighting devices described below by way of representative examples are a two-light entrance plane type whereby light is admitted through two sides of the light guide plate, these examples are not limitative of the scope of the present invention.

Embodiment 1

Figure 1:
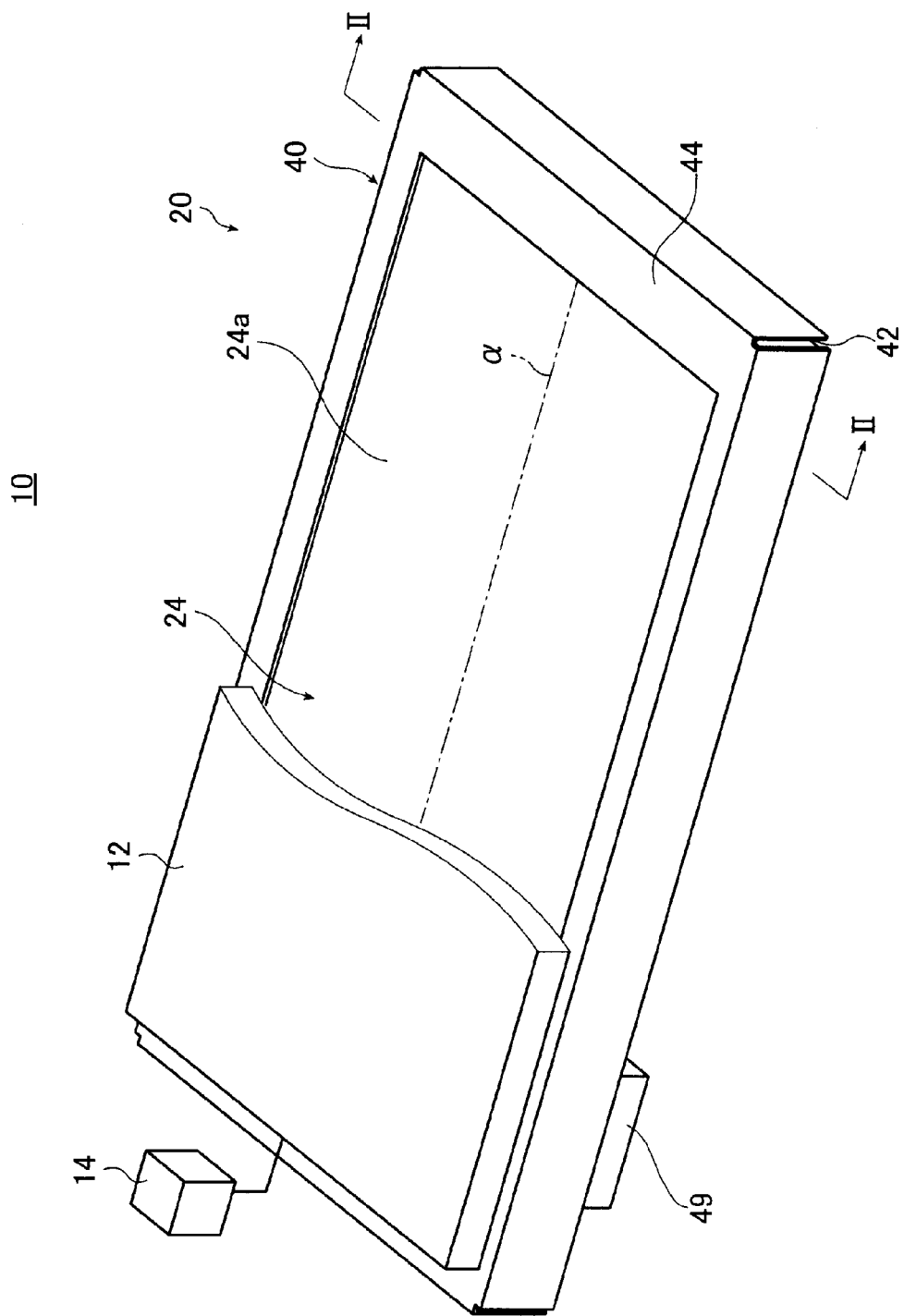
FIG. 1 is a perspective view illustrating a schematic configuration of a liquid crystal display device using a planar lighting device according to Embodiment 1 of the invention.
Figure 2:
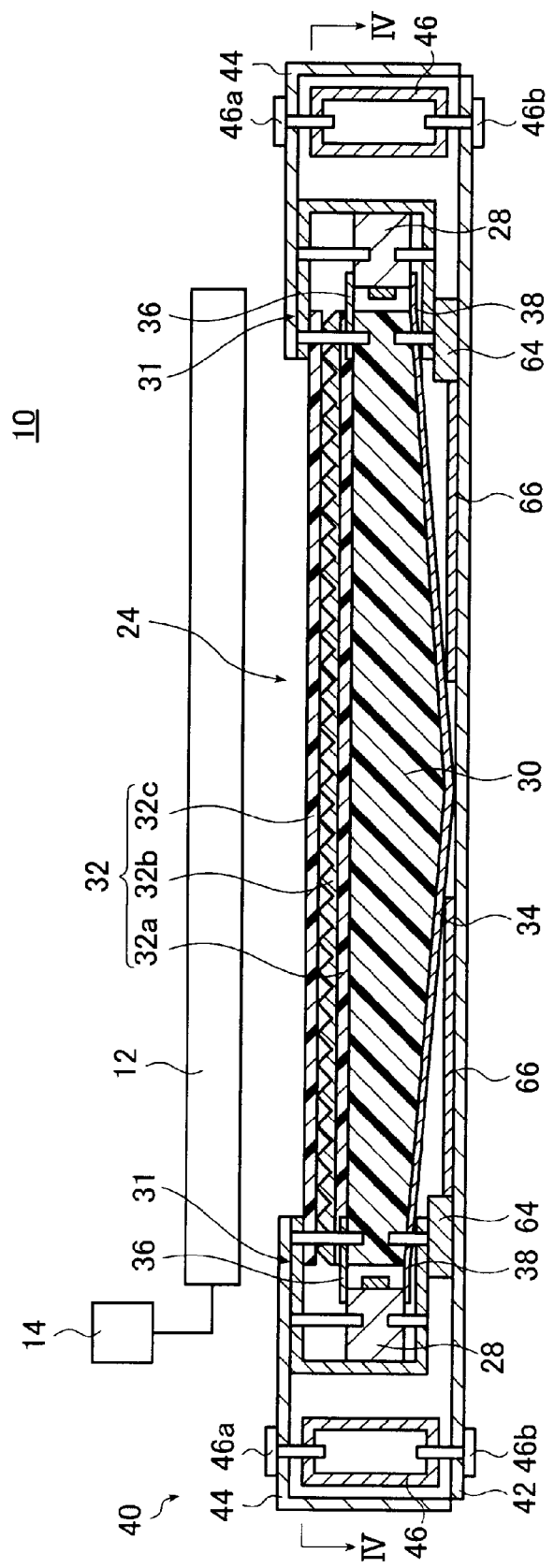
FIG. 2 is a cross sectional view of FIG. 1 taken along line II-II.
Figure 3:
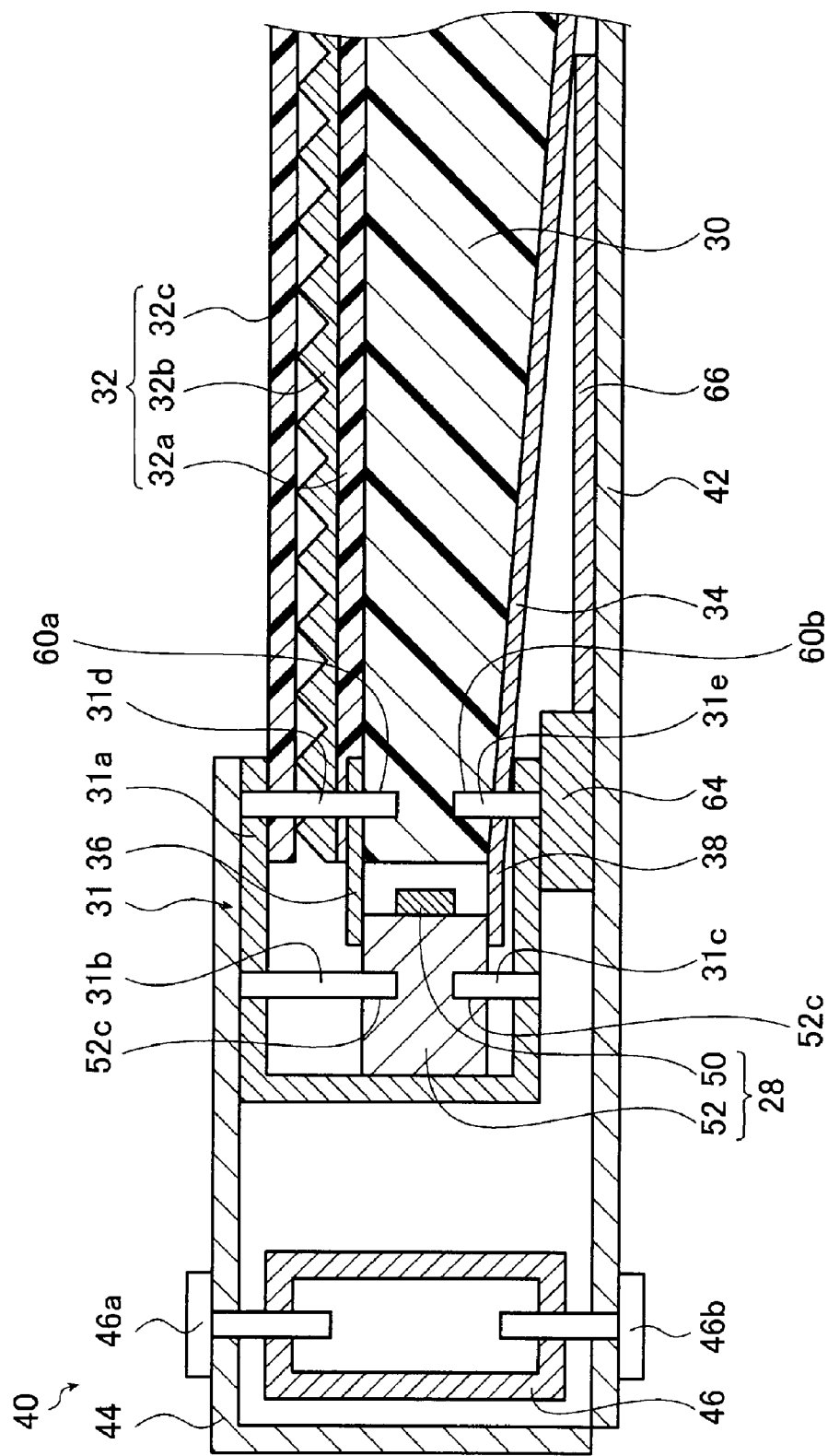
FIG. 3 is a partial expanded view of FIG. 2.
Figure 4A:
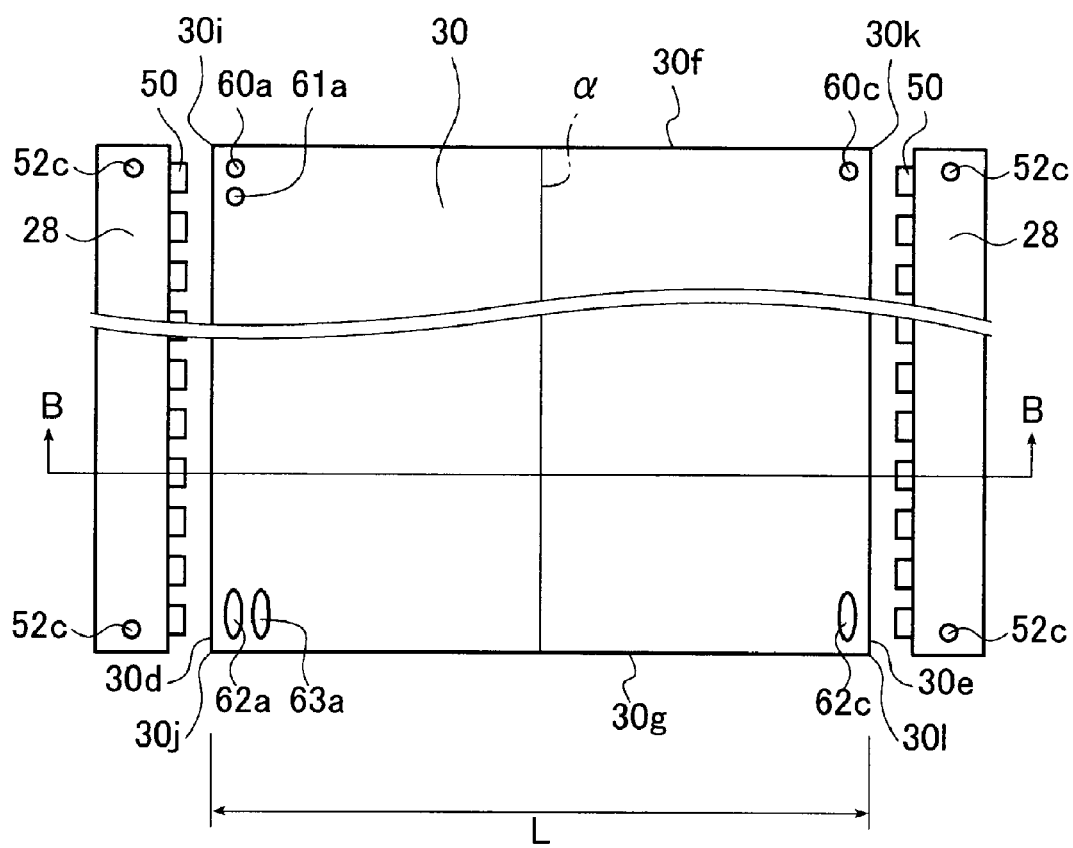
FIG. 4A is a top plan view illustrating a schematic configuration of the planar lighting device of FIG. 2.
Figure 4B:
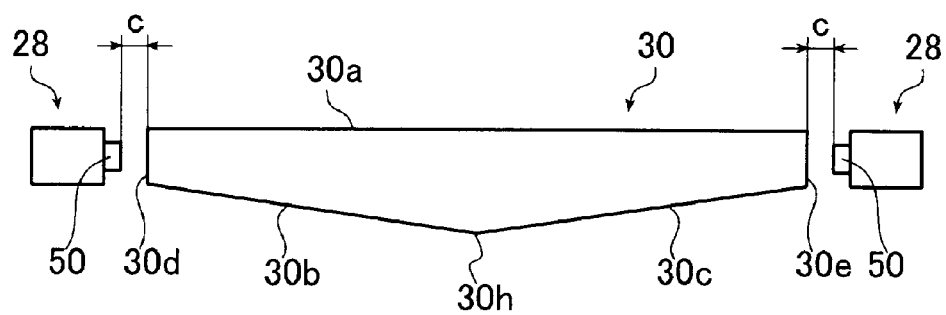
FIG. 4B is a cross sectional view of FIG. 4A taken along line B-B.

FIG. 1 is a perspective view illustrating a schematic configuration of a liquid crystal display device provided with a planar lighting device according to Embodiment 1 of the invention. FIG. 2 is a cross sectional view of the liquid crystal display device illustrating an internal configuration thereof. FIG. 3 is a cross view of the planar lighting device (also referred to as "backlight unit" below) of FIG. 2, where a portion near a light source is illustrated enlarged. FIG. 4A is a top plan view illustrating, partially omitted, the light guide plate of the planar lighting device of FIG. 2 together with light sources disposed on two sides of the light guide plate; and FIG. 4B is a cross sectional view illustrating a configuration of the light sources and the light guide plate of the planar lighting device.

As illustrated in FIG. 1, a liquid crystal display device 10 comprises a backlight unit 20, a liquid crystal display panel 12 disposed on the side of the backlight unit closer to the light exit plane, and a drive unit 14 for driving the liquid crystal display panel 12. In FIG. 1, part of the liquid crystal display panel 12 is not shown to better illustrate the configuration of the planar lighting device.

In the liquid crystal display panel 12, electric field is partially applied to liquid crystal molecules, previously arranged in a given direction, to change the orientation of the molecules. The resultant changes in refractive index in the liquid crystal cells are used to display characters, figures, images, etc., on the liquid crystal display panel 12.

The drive unit 14 applies a voltage to transparent electrodes in the liquid crystal display panel 12 to change the orientation of the liquid crystal molecules, thereby controlling the transmittance of the light transmitted through the liquid crystal display panel 12.

The backlight unit 20 is a lighting device for illuminating the whole surface of the liquid crystal display panel 12 from behind the liquid crystal display panel 12 and comprises a light exit plane 24a having substantially the same shape as an image display surface of the liquid crystal display panel 12.

As illustrated in FIGS. 1, 2, 3, 4A and 4B, the backlight unit 20 comprises a main body 24 and a housing 40. The main body 24 includes two light sources 28, a light guide plate 30, a holder means 31, an optical member unit 32, and a reflection plate 34. The housing 40 includes a lower housing 42, an upper housing 44, and a reinforcing member 46. In the illustrated example, heat sinks 64 and heat pipes 66 are provided between the reflection plate 34 and the lower housing 42.

As illustrated in FIG. 1, a power unit casing 49 is provided on the underside of the lower housing 42 of the housing 40 to hold power supply units that supply the light sources 28 with electrical power.

Now, component parts constituting the backlight unit 20 will be described.

As illustrated in FIG. 2, the main body 24 includes the light sources 28 for emitting light, a light guide plate 30 for emitting the light emitted by the light sources 28 to produce planar light, a holder means 31 for fastening the light guide plate 30 and the light sources 28 with an optical axis distance and an optical axis vertical distance between them kept constant, an optical member unit 32 for scattering and diffusing the light emitted from the light guide plate 30 to obtain light with further reduced unevenness, and a reflection plate 34 for reflecting light leaked from the light guide plate 30 to admit the light back into the light guide plate 30.

The optical axis distance between the light guide plate 30 and the light sources 28 is the distance c as indicated in FIG. 4B between the light emission planes of the light sources 28 and the light entrance plane 30d and 30e of the light guide plate 30. The optical axis vertical distance between the light guide plate 30 and the light sources 28 is a distance between the light guide plate 30 and the light source 28 in the direction of thickness of the light guide plate, i.e., in the direction perpendicular to the light exit plane 30a.

First, the light sources 28 will be described.

Figure 5A:
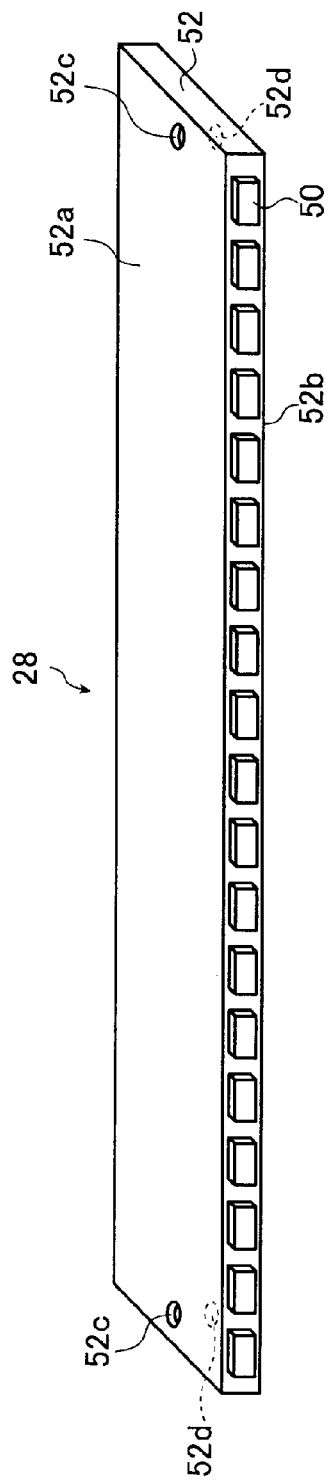
FIG. 5A is a perspective view illustrating a schematic configuration of the light source of the planar lighting device of FIG. 2.
Figure 5B:
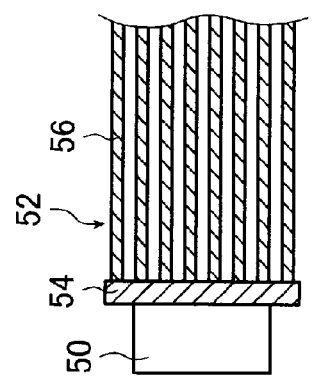
FIG. 5B is a partial cross sectional view of the light source of FIG. 5A.
Figure 5C:
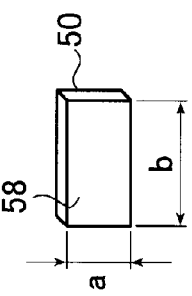
FIG. 5C is an expanded perspective view illustrating an schematic configuration of one of the LEDs forming the light source of FIG. 5A.

FIG. 5A is a perspective view illustrating a schematic configuration of the light source 28 of the planar lighting device 20 of FIGS. 1 and 2; FIG. 5B is a cross sectional view of the light source 28 illustrated in FIG. 5A; and FIG. 5C is a perspective view illustrating a schematic configuration, as enlarged, only one of LEDs 50 forming the light source 28 of FIG. 5A.

As illustrated in FIG. 5A, the light source 28 comprises the LED chips 50 and a light source support 52.

Each LED chip 50 is a chip of a light emitting diode emitting blue light the surface of which has a fluorescent substance applied thereon. It has a light emission face 58 with a given area through which white light is emitted.

Specifically, when blue light emitted through the surface of a light emitting diode of the LED chip 50 is transmitted through the fluorescent substance, the fluorescent substance generates fluorescence. Thus, when blue light emitted by the light emitting diode is transmitted through the fluorescent substance, the blue light and the light radiated as the fluorescent substance generates fluorescence blend to produce and emit white light.

The LED chip 50 may for example be formed by applying a YAG (yttrium aluminum garnet) base fluorescent substance to the surface of a GaN base light emitting diode, an InGaN base light emitting diode, etc.

As illustrated in FIG. 5B, the light source support 52 comprises an array base 54 and a plurality of fins 56. The LED chips 50 described above are arranged in a single row on the array base 54 at given intervals. Specifically, the LED chips 50 constituting the light source 28 are arrayed along the length of a first light entrance plane 30d or a second light entrance plane 30e of the light guide plate 30 to be described, that is, parallel to a line in which the first light entrance plane 30d or the second light entrance plane 30e meets a light exit plane 30a and secured to the array base 54.

The array base 54 is a plate member disposed such that one surface thereof faces the light entrance plane 30d or 30e, which is a lateral end face of the light guide plate 30 at which the light guide plate 30 is thinnest. The LED chips 50 are carried on that lateral plane of the array base 54 facing the light entrance plane 30d or 30e, of the light guide plate 30.

The array base 54 according to the embodiment under discussion is formed of a metal having a good heat conductance as exemplified by copper and aluminum. The array base 54 also acts as a heat sink to absorb heat generated by the LED chips 50 and releases the heat to the outside.

The fins 56 are plate members each formed of a metal having a good heat conductance as exemplified by copper and aluminum.

The fins 56 are connected to the array base 54 on the side thereof opposite from the LED chips 50 and spaced a given distance from neighboring fins 56. The plurality of fins 56 provided in the light source support 52 ensure a large surface area and a high heat dissipation efficiency, increasing the efficiency with which the LED chips 50 are cooled.

While the embodiment under discussion uses the array base 54 of the light source support 52 as heat sink, a plate member without a heat-releasing function may be used to form the array base in place of the array base 54 having a function of a heat sink, where the LED chips need not be cooled.

As illustrated in FIG. 5A, screw holes 52c are formed in two places adjacent both ends of a top surface 52a (specifically, a top fin 56) of the light source support 52. Similarly, screw holes 52d are formed in positions corresponding to the screw holes 52c in a bottom surface 52b (specifically, a bottom fin 56) of the light source support 52. As will be described, the screw holes 52c and 52d are used for securing the light source 28 to the holder means 31 with screws 31b and 31c as illustrated in FIG. 3.

As illustrated in FIG. 5C, the LED chips 50 of the embodiment under discussion each have a rectangular shape such that the sides perpendicular to the direction in which the LED chips 50 are arrayed are shorter than the sides lying in the direction in which the LED chips 50 are arrayed or, in other words, the sides lying in the direction of thickness of the light guide plate 30 to be described, i.e., the direction perpendicular to the light exit plane 30a, are the shorter sides. Expressed otherwise, the LED chips 50 each have a shape defined by b>a where "a" denotes the length of the sides perpendicular to the light exit plane 30a of the light guide plate 30 and "b" denotes the length of the sides in the array direction. Now, let "q" be an array pitch of the arrayed LED chips 50, then an inequality q>b is held. Thus, the length "a" of the sides of the LED chips 50 perpendicular to the light exit plane 30a of the light guide plate 30, the length "b" of the sides in the array direction, and the pitch "q" by which the LED chips 50 are arrayed preferably have a relationship satisfying q>b>a.

Providing the LED chips 50 each having the shape of a rectangle allows a thinner design of the light source to be achieved while producing a large amount of light. A thinner light source, in turn, enables a thinner design of the planar lighting device to be achieved. Further, the number of LED chips 50 that need to be arranged may be reduced.

While the LED chips 50 each preferably have a rectangular shape with the shorter sides lying in the direction of the thickness of the light guide plate 30 for a thinner design of the light source, i.e., the direction perpendicular to the light exit plane 30a, the present invention is not limited thereto, allowing each LED chip to have any shape as appropriate such as a square, a circle, a polygon, and an ellipse.

While the LED chips 50, arranged in a single row, has a monolayered structure in the embodiment under discussion, the present invention is not limited thereto; one may use multilayered LED arrays for the light source comprising LED arrays each carrying LED chips 50 on the array base 54. Where the LEDs are thus stacked, more LED arrays can be stacked when the LED chips 50 are each adapted to have a rectangular shape and the LED arrays are each adapted to have a reduced thickness. Where the LED arrays are stacked to form a multilayer structure, that is to say, where more LED arrays (LED chips) are packed into a given space, a large amount of light can be generated. Preferably, the above relationship also applies to the distance separating the LED chips of an LED array in one layer from the LED chips of another LED array in the adjacent layer. Expressed otherwise, the LED arrays preferably are stacked such that the LED chips in one layer are spaced a given distance apart from the LED chips in the adjacent layer.

Now, the light guide plate 30 having a characteristic configuration according to the embodiment will be described.

Figure 6:
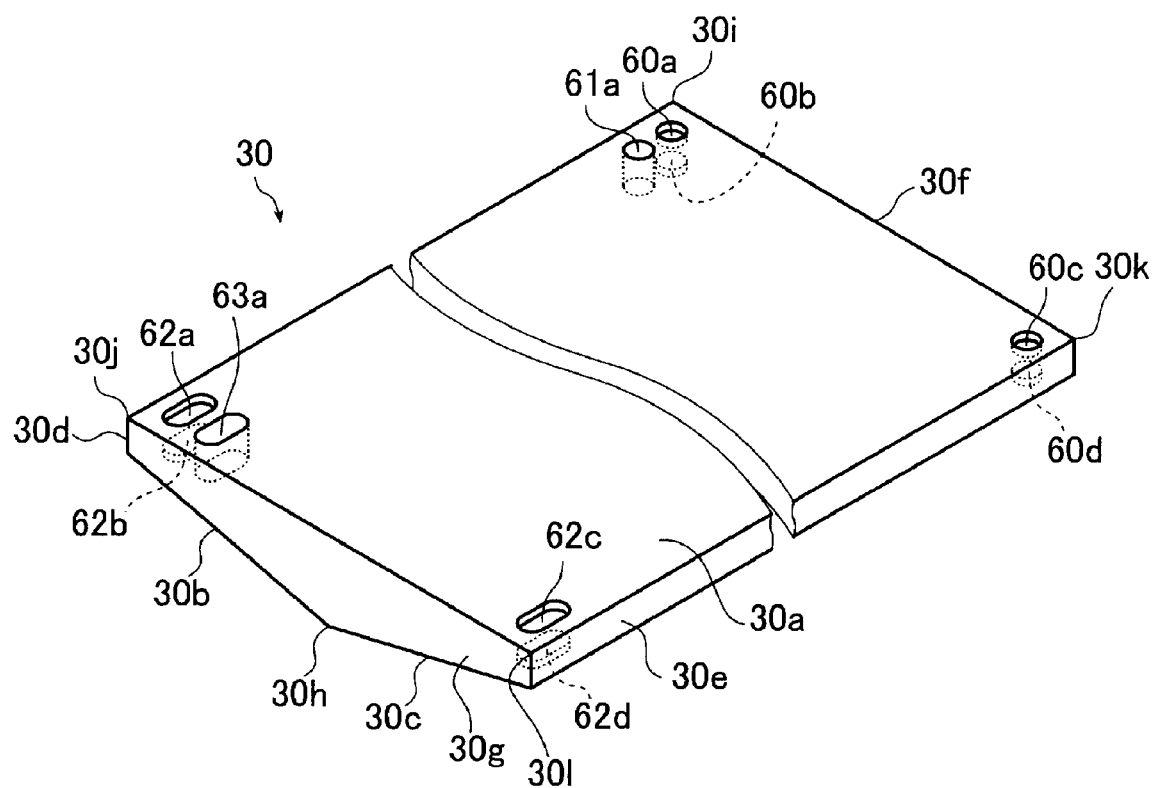
FIG. 6 is a perspective view illustrating the shape of the light guide plate of FIG. 4 schematically.
Figure 7A:
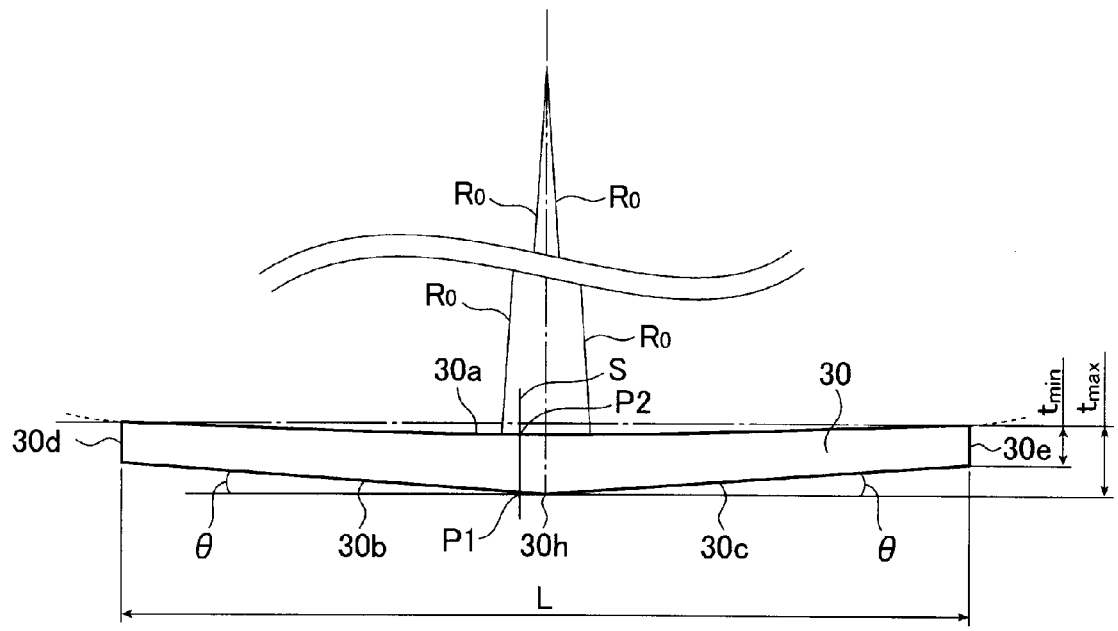
FIG. 7A is a schematic sectional view of the light guide plate of FIG. 2.

FIG. 6 is a perspective view illustrating the schematic configuration of the light guide plate 30. FIG. 7A is a cross sectional view illustrating the shape of the light guide plate 30; and FIG. 7B is a partial enlarged view of FIG. 7A.

As illustrated in FIGS. 6 and 7A, the light guide plate 30 comprises the light exit plane 30a which is slightly concave and substantially rectangular; two light entrance planes, the first light entrance plane 30d and the second light entrance plane 30e, formed on both sides of the light exit plane 30a and substantially perpendicular to the light exit plane 30a; two inclined planes, a first inclined plane 30b and a second inclined plane 30c, located on the opposite side from the light exit plane 30a, i.e., on the underside of the light guide plate 30 so as to be symmetrical to each other with respect to a central axis, or the bisector α bisecting the light exit plane 30a (see FIGS. 1 and 4A) in a direction parallel to the first light entrance plane 30d and the second light entrance plane 30e, and inclined a given angle with respect to the light exit plane 30a; and two lateral planes, a first lateral plane 30f and a second lateral plane 30g, formed substantially vertical to the light exit plane 30a on the sides of the light exit plane 30a on which the light entrance planes are not formed, i.e., on the two sides perpendicular to the sides where the light exit plane 30a and the light entrance planes 30d, 30e meet. A curved portion 30h having a radius of curvature Rr is formed at a joint between two inclined planes, the first inclined plane 30b and the second inclined plane 30c (see FIG. 7B) to prevent occurrence of uneven brightness such as bright lines.

Figure 7B:
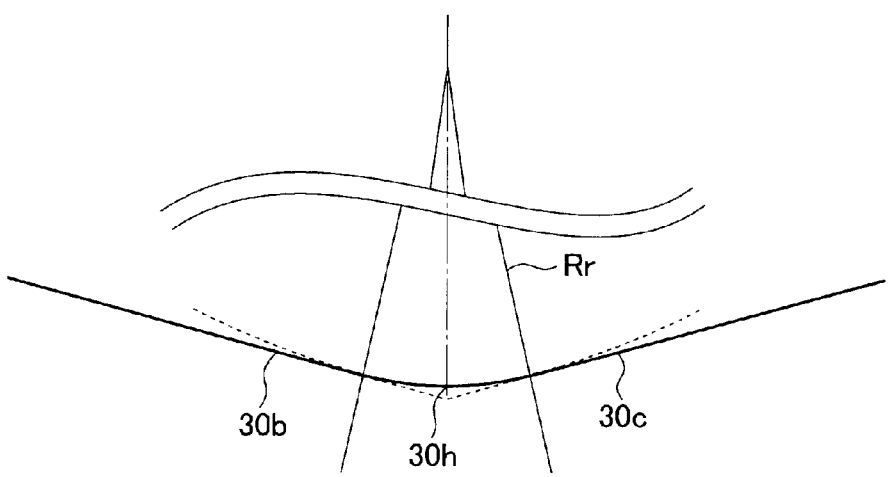
FIG. 7B is an expanded view of FIG. 7A.

Preferably, the radius of curvature Ro of the light exit plane 30a is greater than the radius of curvature Rr of the curved portion 30h as illustrated in FIGS. 7A and 7B, and is 55000 mm to 120000 mm both inclusive whereas the radius of curvature Rr of the curved portion 30h is 10000 mm to 55000 mm both inclusive.

In FIG. 7A, the joint where the inclined plane 30b joins the curved portion 30h is assumed to be point P1, and the intersection where the light exit plane 30a meets a line S passing through point P1 and parallel to the light entrance plane 30d is assumed to be point P2. Also when the light exit plane 30a of the light guide plate 30 is formed to be a concave plane curved toward the reflection plate 34, an angle U formed by a tangent to the curved portion 30h at point P1 and a tangent to the light exit plane 30a at point P2 can be made equivalent, by adapting the radii of curvature of the light exit plane 30a and the curved portion 30h to lie in the above respective ranges, to a corresponding angle as in the case of the light guide plate having a flat light exit plane in a preferable manner, thus allowing light to propagate deep into the light guide plate 30.

Preferably, the radius of curvature Rr of the curved portion 30h is smaller than that in the case of the light guide plate having a flat light exit plane and having the same configuration except for the curved portion.

Where the light guide plate 30 has a concave light exit plane 30a as illustrated in FIGS. 7A and 7B, an angle V formed by a tangent to the light exit plane 30a at one end thereof adjacent the light entrance plane 30*d* (or 30*e*) and the inclined plane 30*b* (or 30*c*) is preferably 0.1° to 0.8° both inclusive.

Where the angle V formed by the light exit plane 30*a* and each of the inclined planes 30*b* and 30*c* is 0.1° to 0.8° both inclusive, light admitted through the light entrance planes 30*d* and 30*e* is allowed to reach still deeper into the light guide plate 30.

The angle U formed by a tangent to the curved portion 30*h* at point P1 and a tangent to the light exit plane 30*a* at point P2 is preferably equivalent to the angle V formed by the tangent to the light exit plane 30*a* at either end thereof adjacent the corresponding light entrance plane 30*d* or 30*e* and the inclined plane 30*b* or 30*c*. In the above case, the joint between the curved portion 30*h* and the inclined plane 30*b* or 30*c*, i.e. point P1, needs not necessarily provide a smooth joint.

When the light guide plate 30 has a configuration where the above two angles U and V are equivalent with each other, the reflection angle of the light inside the light guide plate 30 can be equivalent to that in the case of the light guide plate having a flat light exit plane, and the optical path of the light admitted into the light guide plate 30 can be equivalent to that in the case of the light guide plate having a flat light exit plane. Thus, the light guide plate 30 having a curved light exit plane 30*a* can emit light providing an intensity distribution equivalent to that in the case of the light guide plate having a flat light exit plane. Further, the intensity distribution equivalent to that in the case of the light guide plate having a flat light exit plane permits emission of light yielding an increased light use efficiency and representing a high middle-high ratio through the light exit plane 30*a*.

It is preferable to determine the angle U formed by a tangent to the curved portion 30*h* at point P1 and a tangent to the light exit plane 30*a* at point P2 by using as a reference the light guide plate having a flat light exit plane and yielding a good light use efficiency and middle-high ratio.

Specifically, light use efficiency and middle-high ratio equivalent to those of the reference light guide plate having a flat light guide plate are achieved by adapting the angle U formed by a tangent to the curved portion 30*h* at point P1 and a tangent to the light exit plane 30*a* at point P2 to be greater than or equal to the corresponding angle formed by a line parallel to the light exit plane and a tangent to the curved portion at the joint between the curved portion and either inclined plane in the reference light guide plate having a flat light guide plate.

For example, a reference light guide plate may have a flat light exit plane measuring 42 inches, a light guiding length L of 550 mm, a minimum thickness of 2 mm (at which light is admitted), inclined planes having a taper angle of 0.42°, a curved portion having a radius of curvature of 15,000 mm, joints between the inclined planes and the curved portion located at a distance of 200 mm from the center of the light guide plate, a maximum thickness of 3.9 mm (thickness at the center), a light use efficiency of 60% and a middle-high ratio of 87%.

A light guide plate according to the present embodiment will be considered by using the above-described reference light guide plate as follows: This light guide plate has a light guiding length L of 550 mm, a minimum thickness of 2 mm (at which light is admitted), the light exit plane 30*a* with a radius of curvature of 75000 mm, the inclined planes 30*b* and 30*c* with a taper angle θ of 0.62° (since the inclination angle at the ends of the light exit plane 30*a* having a radius of curvature of 75,000 mm is 0.2°, the angle at the ends of the light exit plane 30*a* formed by a tangent to the light exit plane 30*a* at the intersection where the light exit plane 30*a* and either light entrance plane 30*d* or 30*e* meet and the inclined planes 30*b* and 30*c* is) 0.42°), a curved portion 30*h* having a radius of curvature of 10,000 mm, joints between the inclined planes 30*b*, 30*c* and the curved portion 30*h* located at a distance of 200 mm from the center of the light guide plate 30, and a maximum thickness of 3.9 mm (thickness at the center). Further, the angle U formed by a tangent to the curved portion 30*h* at point P1 (the joint between the inclined plane 30*b* or 30*c* and the curved portion 30*h*) and a tangent to the light exit plane 30*a* at point P2 (the intersection where the light exit plane 30*a* meets a straight line S passing through the joint and parallel to the light entrance plane 30*d* or 30*e*) is set to be greater than the angle formed, in the reference light guide plate, by a line parallel to the light exit plane and a tangent to the curved portion at the joint between the curved portion and the inclined planes, the angle U making it easier for totally reflected light components to reach deeper into the light guide plate 30. Thus, the intensity distribution of the emitted light acquires a still more accentuated high-in-the-middle curve while the light use efficiency and the middle-high ratio can be equivalent to those yielded by the reference light guide plate having the flat light exit plane or, specifically, a light use efficiency of 60% and a middle-high ratio of 87% are achieved.

As illustrated in FIG. 6, a first circular hole 60*a* and a second circular hole 60*c* for securing the light guide plate 30 to a holder member 31*a* are made in the light exit plane 30*a* close to and inwardly of a corner 30*i* where the first light entrance plane 30*d* intersects the first lateral plane 30*f* and a corner 30*k* where the second light entrance plane 30*e* intersects the first lateral plane 30*f*, respectively. A first circular hole 60*b* and a second circular hole 60*d* are made in the rear plane of the light guide plate 30 in positions corresponding to the first circular hole 60*a* and the second circular hole 60*c*, respectively.

A first long hole 62*a* and a second long hole 62*c* long in a direction parallel to the light entrance planes 30*d* and 30*e* for securing the light guide plate 30 to the holder member 31*a* are made in the light exit plane 30*a* close to and inwardly of a corner 30*j* where the first light entrance plane 30*d* intersects the second lateral plane 30*g*, and a corner 30*l* where the second light entrance plane 30*e* intersects the second lateral plane 30*g*. A first long hole 62*b* and a second long hole 62*d* are made in the rear plane of the light guide plate 30 in positions corresponding to the first long hole 62*a* and the second long hole 62*c*, respectively.

A third circular hole 61*a* for connecting the light guide plate 30 to the upper housing 44 and the lower housing 42 of the housing 40 is made close to and inwardly of the corner 30*i* in which the first circular hole 60*a* is made.

A third long hole 63*a* longer in the direction parallel to the light entrance plane 30*d* for connecting the light guide plate 30 to the upper housing 44 and the lower housing 42 of the housing 40 is made close to and inwardly of each corner 30*j* in which the first long hole 62*a* is made.

The two light entrance planes 30*d* and 30*e* are located opposite each other adjacent the opposite longer sides of the substantially rectangular light exit plane 30*a*, respectively. The light emitted from the opposite light sources 28 and admitted through the two light entrance planes 30*d* and 30*e* travels inside the light guide plate 30 parallel to the opposite shorter sides of the substantially rectangular light exit plane 30*a*.

The first inclined plane 30*b* and the second inclined plane 30*c* are axisymmetrical with respect to the bisector α and symmetrically inclined with respect to the light exit plane 30*a*. The curved portion 30*h* is also axisymmetrically curved with respect to the bisector α. As illustrated in FIG. 7, the light guide plate 30 grows thicker with the increasing distance from the first light entrance plane 30*d* and the second light entrance plane 30*e* toward the center such that the light guide plate 30 is thickest ($t_{max}$) in a position thereof corresponding to the central bisector X, i.e., in the middle of the curved portion 30*h* and thinnest ($t_{min}$) at the two light entrance planes (the first light entrance plane 30*d* and the second light entrance plane 30*e*) on both ends.

Thus, the light guide plate 30 has a cross section axisymmetrical with respect to the central axis passing through the bisector α thereof.

In the embodiment, a light guiding length L that the light travels between the first light entrance plane 30*d* and the second light entrance plane 30*e* needs to be 280 mm or greater since the liquid crystal display panel 12 for which the inventive light guide plate is intended has a screen size of 22 inches at minimum and needs to be 830 mm or less since the liquid crystal display panel 12 for which the inventive light guide plate is intended has a screen size of 65 inches at maximum. More specifically, it is preferable that the light guiding length L (see FIG. 7A) measures 280 mm to 320 mm both inclusive for a screen size of 22 inches, 480 mm to 500 mm both inclusive for screen sizes of 37 inches, 515 mm to 620 mm both inclusive for screen sizes of 42 inches and 46 inches, 625 mm to 770 mm both inclusive for screen sizes of 52 inches and 57 inches, and 785 mm to 830 mm both inclusive for a screen size of 65 inches.

The minimum thickness $t_{min}$ of the light guide plate 30 at the light entrance planes 30*d* and 30*e*, where the light guide plate is thinnest, is preferably 0.5 mm to 3.0 mm both inclusive.

This is because if the minimum thickness is excessively small, the light entrance planes 30*d* and 30*e* are excessively small, and the amount of light admitted from the light sources 28 decreases, making the brightness of the light emitted through the light exit plane 30*a* insufficient, whereas if the minimum thickness is excessively great, the maximum thickness is excessively great, and the weight increases excessively, making the light guide plate unsuitable as an optical member of the liquid crystal display device and the like while failing to yield a light use efficiency of 55% or greater as the light is allowed to pass through the light guide plate.

The maximum thickness $t_{max}$ of the light guide plate 30 at the curved portion 30*h*, where the light guide plate is thickest, is preferably 1.0 mm to 6.0 mm both inclusive.

This is because if the maximum thickness is excessively great, the weight increases excessively, making the light guide plate unsuitable as an optical member of the liquid crystal display device and the like while failing to yield a light use efficiency of 55% or greater as the light is allowed to pass through the light guide plate, whereas if the maximum thickness is excessively small, the curved portion 30*h* at the center has such a great radius of curvature Rr that it is unsuitable for molding and, as in the case of the flat light guide plate, a light use efficiency of 55% or greater is impossible to achieve at a particle density that permits a high-in-the-middle brightness distribution while, conversely, a high-in-the-middle distribution is impossible to achieve at a particle density that yields a light use efficiency of 55% or greater.

Accordingly, the inclination angle or the taper angle θ of the inclined rear planes 30*b* and 30*c* is preferably 0.1° to 2.2° both inclusive.

This is because if the taper angle θ is excessively great, the maximum thickness is greater than is necessary and the brightness exhibits an overly accentuated high-in-the-middle distribution curve, whereas if the taper angle θ is excessively small, as in the cases where the minimum thickness is excessively small, the radius Rr of the curved portion 30*h* (also referred to as "radius Rr of the central portion" below) is so great that it is unsuitable for molding and, as in the case of the flat light guide plate, a high-in-the-middle distribution is impossible to achieve at a particle density that yields a light use efficiency of 55% or greater while, conversely, a light use efficiency of 55% or greater is impossible to achieve at a particle density that permits a high-in-the-middle brightness distribution.

Thus, the radius of curvature Rr of the curved portion 30*h* is preferably 1,500 mm to 45,000 mm both inclusive.

Now, let θ be the taper angle of the inclined rear planes 30*b* and 30*c* as illustrated in FIGS. 7A and 7B. Then, the following equations are satisfied:

$$L_R = 2R \sin \theta$$

$$t_{max}\text{(the maximum thickness)} = t_{min} - [(L_R/2)\tan\theta + R\cos\theta - R]\theta = \tan^{-1}[(t_{max}-t_{min})/(L/2)]$$

In the embodiment, the light guide plate 30, shaped such that its thickness increases with the increasing distance from the first light entrance plane 30*d* and the second light entrance plane 30*e* toward the center thereof (the shape being referred to as "reversed wedge shape" below), makes it easier for the incoming light to travel still deeper into the light guide plate, thus improving the in-plane uniformity while maintaining the light use efficiency and further achieving a high-in-the-middle, bell-curve brightness distribution. In other words, such a shape achieves an even or a high-in-the-middle, bell-curve distribution where the conventional, flat light guide plate could only provide a distribution that is dark in the middle.

Further, a smooth joint achieved by providing the curved portion 30*h* between the inclined rear planes 30*b* and 30*c* eliminates a brightness line that would otherwise show along the central joint and enables an even or a high-in-the-middle, bell-curve distribution to be achieved.

Now, an example will be given below to show how light use efficiency and in-plane uniformity vary as the taper angle of a light guide plate having the shape of a reversed wedge is changed.

Table 1 shows light use efficiency and in-plane uniformity obtained by simulation with the light guide plate 30 illustrated in FIG. 7A, wherein the maximum thickness $t_{max}$ was changed, with the minimum thickness $t_{min}$ and the light guiding length L kept the same, to change the taper angle θ of the inclined planes 30*b* and 30*c*. The in-plane uniformity is the ratio of a minimum brightness of the light emitted from the light exit plane 30*a* of the light guide plate 30 to a maximum brightness expressed as minimum brightness/maximum brightness.

TABLE 1

|  | Tmin [mm] | Tmax [mm] | L [mm] | Taper angle θ | Light use efficiency | In-plane uniformity |
| --- | --- | --- | --- | --- | --- | --- |
| Flat plate | 2 | 2 | 300 | 0 | 74% | 67% |
| TP1 | 2 | 3 | 300 | 0.38° | 77% | 82% |
| TP2 | 2 | 4 | 300 | 0.76° | 77% | 85% |
| TP3 | 2 | 6 | 300 | 1.53° | 78% | 69% |

Figure 8:
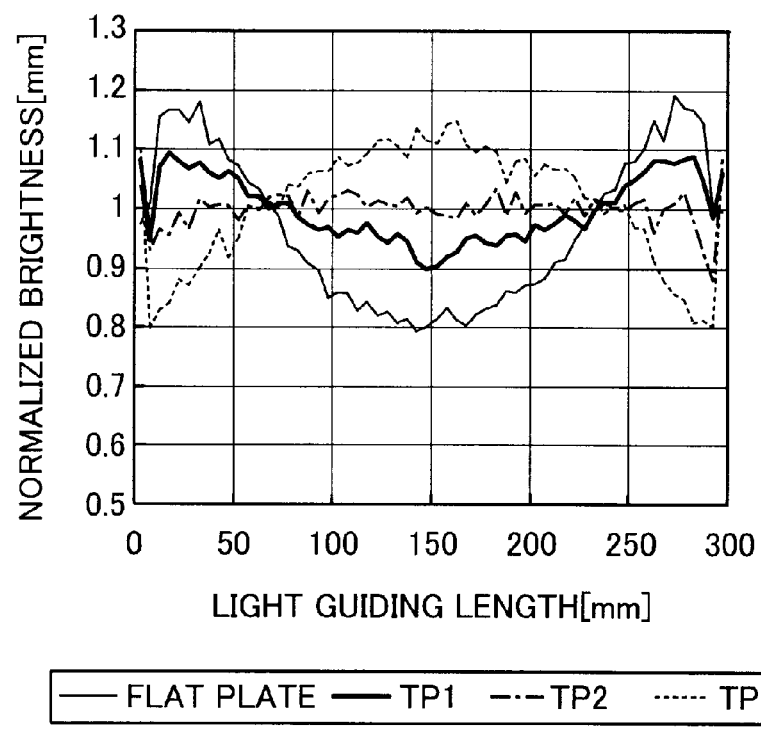
FIG. 8 is a graph illustrating relationships between brightness distribution and taper angle of the light guide plate obtained by simulation under various conditions.

Further, FIG. 8 illustrates relationships between brightness distribution and taper angle θ obtained by simulation with the light guide plate 30 described in Table 1. FIG. 8 indicates a normalized brightness on the vertical axis and the distance [mm] from one end of the light guide plate on the horizontal axis. The normalized brightness denotes a normalized value with the average brightness of TP2, one of the calculation examples, taken to be "1".

Table 1 and FIG. 8 show that the in-plane uniformity can be improved while maintaining the light use efficiency by adapting the light guide plate to have the shape of a reversed wedge. In addition, it is also apparent that the taper angle θ in the range of 0.1° to 0.8° both inclusive further increases the in-plane uniformity while maintaining or increasing the light use efficiency.

Further, Table 2 shows light use efficiency and middle-high ratio of a light guide plate having the shape of a reversed wedge obtained by simulation as the taper angle θ of the light guide plate was changed.

Using the light guide plate 30 illustrated in FIGS. 4A and 4B, the light use efficiency and the brightness distribution of the light emitted through the light exit plane 30a was obtained with the taper angle θ varied by changing the maximum thickness and the minimum thickness of the 22-inch light guide plate 30 to determine the middle-high ratio of the brightness distribution, which represents a ratio of the brightness of the light emitted through a central area of the light exit plane 30a to the brightness of the light emitted through a periphery of the light exit plane 30a, i.e., areas close to the light entrance planes 30d and 30e. All the parameters other than the taper angle θ meet their respective preferred ranges as required according to the invention.

TABLE 2

|  | 1 | 2 | 3 |
| --- | --- | --- | --- |
| Screen size | 22" | 22" | 22" |
| Light guiding length [mm] | 288 | 288 | 288 |
| Maximum thickness [mm] | 3.57 | 0.89 | 4.91 |
| Minimum thickness [mm] | 2 | 0.5 | 0.5 |
| Particle diameter [μm] | 7 | 7 | 7 |
| Particle density [wt %] | 0.18 | 0.2 | 0.2 |
| Taper angle [°] | 0.80 | 0.20 | 2.19 |
| Rr of central portion [mm] | 4500 | 18000 | 1500 |
| Light use efficiency [%] | 56.8 | 58.6 | 62.2 |
| Middle-high ratio [%] | 14 | 13 | 22 |

It is apparent from Table 2 that when the taper angle θ is in a range of 0.1° to 2.2° both inclusive, the light use efficiency is over 56%, which meets a limited range according to the invention by being higher than 55%, while the middle-high ratio is 13% to 22%, which also meets a limited range of above 0% and not greater than 25% according to the embodiment.

In the light guide plate 30 illustrated in FIGS. 4A and 4B, light entering the light guide plate 30 through the first light entrance plane 30d and the second light entrance plane 30e is scattered as it travels through the inside of the light guide plate 30 by scattering particles contained inside the light guide plate 30 as will be described later in detail and, directly or after being reflected by the first inclined plane 30b or the second inclined plane 30c, exits through the light exit plane 30a. In the process, some light may leak through the first inclined plane 30b and the second inclined plane 30c. However, it is then reflected by the reflection sheet (not shown) provided in such a manner as to cover the first inclined plane 30b and the second inclined plane 30c to enter the light guide plate 30 again.

In the light guide plate 30 illustrated in FIGS. 4A and 4B, light entering the light guide plate 30 through the first light entrance plane 30d and the second light entrance plane 30e is scattered as it travels through the inside of the light guide plate 30 by scattering particles contained inside the light guide plate 30 as will be described later in detail and, directly or after being reflected by the first inclined plane 30b or the second inclined plane 30c, exits through the light exit plane 30a. In the process, some light may leak through the first inclined plane 30b or the second inclined plane 30c. However, it is then reflected by the reflection sheet (not shown) provided in such a manner as to cover the first inclined plane 30b and the second inclined plane 30c to enter the light guide plate 30 again.

The light guide plate 30 is formed of a transparent resin into which fine scattering particles for scattering light are kneaded and dispersed. Transparent resin materials that may be used to form the light guide plate 30 include optically transparent resins such as PET (polyethylene terephthalate), PP (polypropylene), PC (polycarbonate), PMMA (polymethyl methacrylate), benzyl methacrylate, MS resins, and COP (cycloolefin polymer). The scattering particles kneaded and dispersed into the light guide plate 30 may be formed, for example, of TOSPEARL (trademark), silicone, silica, zirconia, or a derivative polymer. The light guide plate 30 containing the scattering particles is capable of emitting uniform illuminating light through the light exit plane 30a with minimized unevenness in brightness.

The diameter of the scattering particles dispersed in the light guide plate 30 used in the planar lighting device of the embodiment needs to be in the range of 40 μm to 12.0 μm both inclusive. This is because the scattering particles of a size selected within that range achieve a high scattering efficiency, has a great forward scattering property and a small wavelength dependency, and do not cause uneven color representation.

A suitable particle diameter for the scattering particles to be dispersed in the light guide plate 30 is preferably determined considering the following in addition to the degree of wavelength dependency.

First of all, in a scattered light intensity distribution (angular distribution) of particles having a single particle diameter, a condition needs to be met that at least 90% of light is scattered within a forward angle of 0° to 5° This is because the light guide plate 30 is required to guide light a distance of at least 140 mm from the first light entrance plane 30d and the second light entrance plane 30e when the light guide plate has a reversed wedge shape and at least 280 mm from the light entrance plane when light is admitted through one side of the light guide plate. If the light scattered within the forward angle of 0° to 5° fails to reach 90%, light cannot be guided deep enough into the light guide plate 30.

Thus, scattering particles having a particle diameter of less than 4.0 μm cause isotropic scattering and fail to meet the above condition. When an acrylic resin is used to provide a matrix and silicone resin is used to form particles, the particle diameter of the silicone resin scattering particles is preferably 4.5 μm or greater.

When the particle diameter of the scattering particles is greater than 12.0 μm, the forward scattering property of the particles intensifies so much that the mean free path within the system increases to reduce the number of scatterings, thus causing uneven brightness among the light source LEDs to show near the edges of the light exit plane near which light is admitted. Thus, the upper limit is set to 12.0 μm.

This is because when the particle density is excessively high, like phenomena result as in the case of the flat light guide plate and a high-in-the-middle brightness distribution cannot be achieved whereas when the particle density is excessively low, light is allowed to pass through, thus failing to meet a light use efficiency of 55% or greater.

Thus, selection of an optimum particle diameter of the scattering particles within a particle range determined as mentioned above (combination of particle refractive index and matrix refractive index) enables emission of light free from uneven wavelengths.

While the above examples use scattering particles all having a single particle diameter, the embodiment is not limited in this way and allows a mixed use of scattering particles having a plurality of particle diameters.

Further, the density of the scattering particles needs to be 0.008 wt % to 0.76 wt % both inclusive because the light guide plate 30 used in the planar lighting device of the embodiment has a light guiding length of 280 mm to 830 mm.

To be more specific, when the light guiding length is in a range of 280 mm$\leq$L$\leq$320 mm, the particle density of the scattering particles needs to be 0.1 wt % to 0.76 wt % both inclusive.

When the light guiding length of the light guide plate is 280 mm for a screen size of 22 inches and the particle diameter of the scattering particles is 4.5 μm, the particle density of the scattering particles is preferably 0.1 wt % to 0.32 wt % both inclusive and most preferably 0.14 wt %. When the particle diameter of the scattering particles is 7.0 μm, the particle density of the scattering particles is preferably 0.14 wt % to 0.5 wt % both inclusive and most preferably 0.21 wt %. Further, when the particle diameter of the scattering particles is 12.0 μm, the particle density of the scattering particles is preferably 0.25 wt % to 0.76 wt % both inclusive and most preferably 0.35 wt %.

When the light guiding length L is in a range of 480 mm$\leq$L$\leq$500 mm, the density of the scattering particles needs to be 0.02 wt % to 0.22 wt % both inclusive.

Where the light guiding length L of the light guide plate, adapted for a 37-inch screen, is 480 mm, and the particle diameter of the scattering particles is 4.5 μm, the density of the scattering particles is more preferably 0.02 wt % to 0.085 wt % both inclusive, and most preferably 0.047 wt %. Where the particle diameter of the scattering particles is 7.0 μm, the density of the scattering particles is more preferably 0.03 wt % to 0.12 wt % both inclusive, and most preferably 0.065 wt %. Where the particle diameter of the scattering particles is 12.0 μm, the density of the scattering particles is more preferably 0.06 wt % to 0.22 wt % both inclusive, and most preferably 0.122 wt %.

Where the light guiding length L is 515 mm$\leq$L$\leq$620 mm, the density of the scattering particles is preferably 0.015 wt % to 0.16 wt % both inclusive.

Where the light guiding length L of the light guide plate, adapted for a 42-inch screen, is 560 mm, and the particle diameter of the scattering particles is 4.5 μm, the density of the scattering particles is more preferably 0.015 wt % to 0.065 wt % both inclusive, and most preferably 0.035 wt %. Where the particle diameter of the scattering particles is 7.0 μm, the density of the scattering particles is more preferably 0.02 wt % to 0.09 wt % both inclusive, and most preferably 0.048 wt %. Where the particle diameter of the scattering particles is 12.0 μm, the density of the scattering particles is more preferably 0.04 wt % to 0.16 wt % both inclusive, and most preferably 0.09 wt %.

Where the light guiding length L of the light guide plate, adapted for a 46-inch screen, is 590 mm, and the particle diameter of the scattering particles is 4.5 μm, the density of the scattering particles is more preferably 0.015 wt % to 0.060 wt % both inclusive, and most preferably 0.031 wt %. Where the particle diameter of the scattering particles is 7.0 μm, the density of the scattering particles is more preferably 0.02 wt % to 0.08 wt % both inclusive, and most preferably 0.043 wt %. Where the particle diameter of the scattering particles is 12.0 μm, the density of the scattering particles is more preferably 0.035 wt % to 0.15 wt % both inclusive, and most preferably 0.081 wt %.

Where the light guiding length L is 625 mm$\leq$L$\leq$770 mm, the density of the scattering particles is preferably 0.01 wt % to 0.12 wt % both inclusive.

Where the light guiding length L of the light guide plate, adapted for a 52-inch screen, is 660 mm, and the particle diameter of the scattering particles is 4.5 μm, the density of the scattering particles is more preferably 0.010 wt % to 0.050 wt % both inclusive, and most preferably 0.025 wt %. Where the particle diameter of the scattering particles is 7.0 μm, the density of the scattering particles is more preferably 0.015 wt % to 0.060 wt % both inclusive, and most preferably 0.034 wt %. Where the particle diameter of the scattering particles is 12.0 μm, the density of the scattering particles is more preferably 0.030 wt % to 0.120 wt % both inclusive, and most preferably 0.064 wt %.

Where the light guiding length L of the light guide plate, adapted for a 57-inch screen, is 730 mm, and the particle diameter of the scattering particles is 4.5 μm, the density of the scattering particles is more preferably 0.010 wt % to 0.040 wt % both inclusive, and most preferably 0.021 wt %. Where the particle diameter of the scattering particles is 7.0 μm, the density of the scattering particles is more preferably 0.010 wt % to 0.050 wt % both inclusive, and most preferably 0.028 wt %. Where the particle diameter of the scattering particles is 12.0 μm, the density of the scattering particles is more preferably 0.020 wt % to 0.100 wt % both inclusive, and most preferably 0.053 wt %.

Where the light guiding length L is 785 mm$\leq$L$\leq$830 mm, the density of the scattering particles is preferably 0.006 wt % to 0.08 wt % both inclusive.

Where the light guiding length L of the light guide plate, adapted for a 65-inch screen, is 830 mm, and the particle diameter of the scattering particles is 4.5 μm, the density of the scattering particles is more preferably 0.008 wt % to 0.030 wt % both inclusive, and most preferably 0.016 wt %. Where the particle diameter of the scattering particles is 7.0 μm, the density of the scattering particles is more preferably 0.009 wt % to 0.040 wt % both inclusive, and most preferably 0.022 wt %. Where the particle diameter of the scattering particles is 12.0 μm, the density of the scattering particles is more preferably 0.020 wt % to 0.080 wt % both inclusive, and most preferably 0.041 wt %.

It is apparent from the foregoing that the particle diameter and density of the scattering particles dispersed in the light guide plate 30 need to meet a given relationship depending upon the light guiding length between the two light entrance planes 30d, 30e of the light guide plate 30 according to the embodiment.

Figure 9:
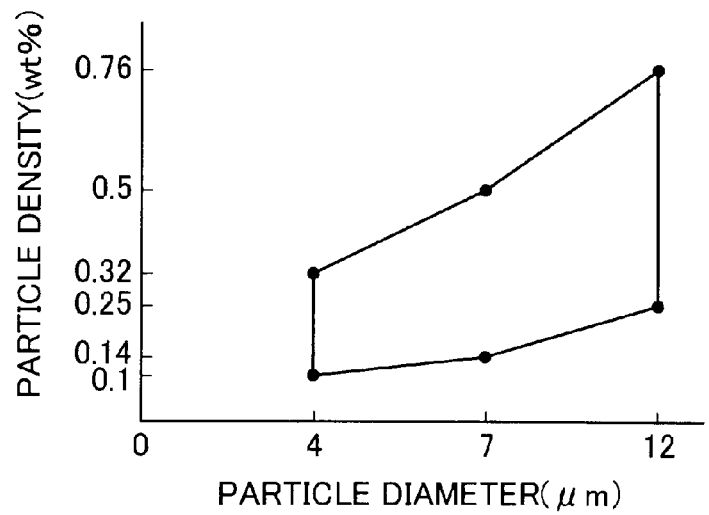
FIGS. 9, 10A, 10B, 11A and 11B are graphs illustrating relationships between particle diameter and particle density of the scattering particles dispersed in various light guide plates according to Embodiment 1 of the invention.

Thus, where the light guiding length of the light guide plate 30 is 280 mm to 320 mm both inclusive, the particle diameter of the scattering particles needs to be 4.0 μm to 12.0 μm both, and the density of the scattering particles needs to be 0.1 wt % to 0.76 wt % both inclusive as described above, and the particle diameter and density of the scattering particles need to be in a region defined by six points (4.0, 0.1), (4.0, 0.32), (7.0, 0.14), (7.0, 0.5), (12.0, 0.25) and (12.0, 0.76) as illustrated in the graph of FIG. 9 where the horizontal axis indicates the particle diameter (μm) of the scattering particles and the vertical axis indicates the particle density of the scattering particles.

Figure 10A:
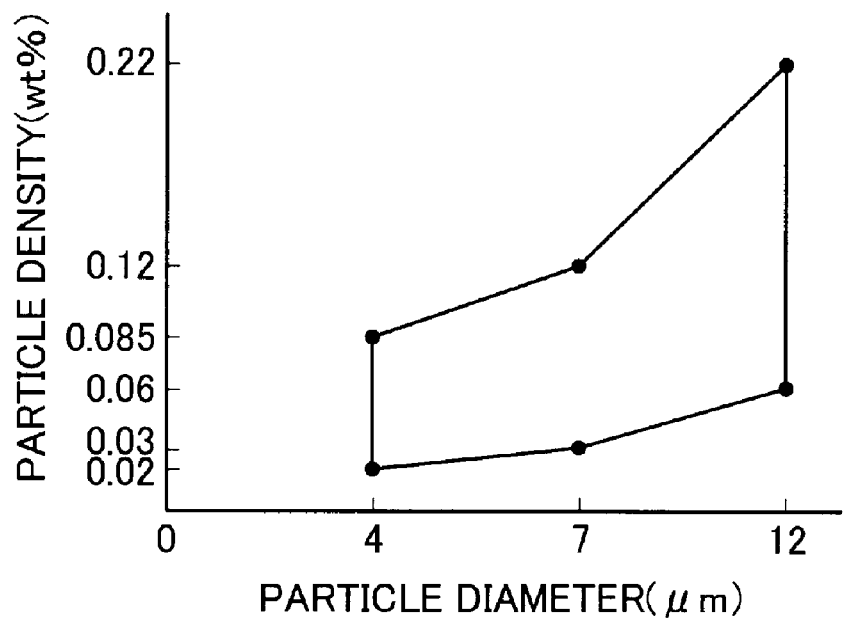
Figure 10B:
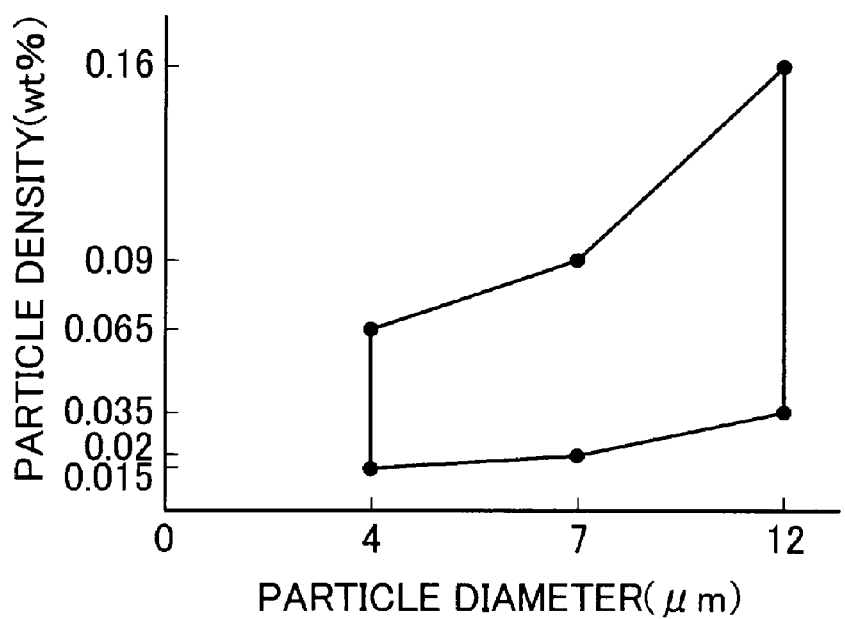
Figure 11A:
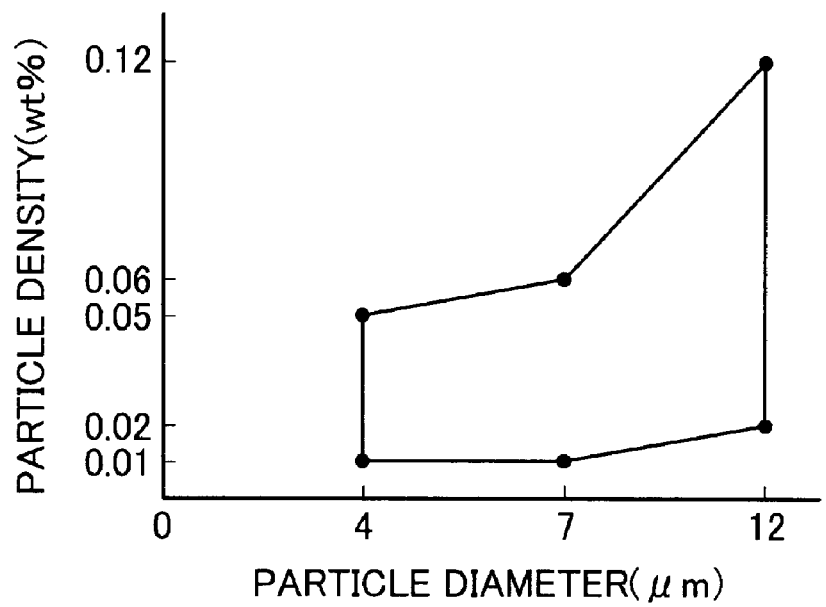
Figure 11B:
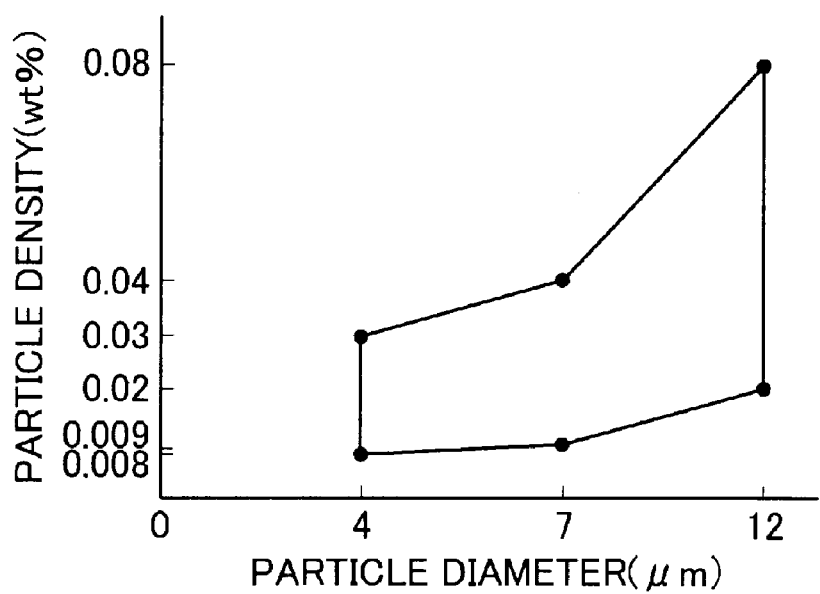

Further, where the light guiding length of the light guide plate 30 is 480 mm to 500 mm both inclusive, the particle diameter of the scattering particles needs to be 4.0 μm to 12.0

μm both inclusive, and the density of the scattering particles needs to be 0.02 wt % to 0.22 wt % both inclusive as described above. In addition, the particle diameter and the particle density of the scattering particles need to be in an area determined by six points (4.0, 0.02), (4.0, 0.085), (7.0, 0.03), (7.0, 0.12), (12.0, 0.06), and (12.0, 0.22) as illustrated in FIG. 10A, where the horizontal axis indicates the particle diameter (μm) of the scattering particles and the vertical axis indicates the particle density (W %) of the scattering particles.

Where the light guiding length of the light guide plate 30 is 515 mm to 620 mm both inclusive, the particle diameter of the scattering particles needs to be 4.0 μm to 12.0 μm both inclusive, and the density of the scattering particles needs to be 0.015 wt % to 0.16 wt % both inclusive as described above. In addition, the particle diameter and the particle density of the scattering particles need to be in an area determined by six points (4.0, 0.015), (4.0, 0.065), (7.0, 0.02), (7.0, 0.09), (12.0, 0.035), and (12.0, 0.16) as illustrated in FIG. 10B, where the horizontal axis indicates the particle diameter (μm) of the scattering particles and the vertical axis indicates the particle density (W %) of the scattering particles.

Where the light guiding length of the light guide plate 30 is 625 mm to 770 mm or smaller, the particle diameter of the scattering particles needs to be 4.0 μm to 12.0 μm both inclusive, and the density of the scattering particles needs to be 0.01 wt % to 0.12 wt % both inclusive as described above. In addition, the particle diameter and the particle density of the scattering particles need to be in an area determined by six points (4.0, 0.01), (4.0, 0.05), (7.0, 0.01), (7.0, 0.06), (12.0, 0.02), and (12.0, 0.12) as illustrated in FIG. 11A, where the horizontal axis indicates the particle diameter (μm) of the scattering particles and the vertical axis indicates the particle density (W %) of the scattering particles.

Where the light guiding length of the light guide plate 30 is 785 mm to 830 mm both inclusive, the particle diameter of the scattering particles needs to be 4.0 μm to 12.0 μm both inclusive, and the density of the scattering particles needs to be 0.008 wt % to 0.08 wt % both inclusive as described above. In addition, the particle diameter and the particle density of the scattering particles need to be in an area determined by six points (4.0, 0.008), (4.0, 0.03), (7.0, 0.009), (7.0, 0.04), (12.0, 0.02), and (12.0, 0.08) as illustrated in FIG. 11B, where the horizontal axis indicates the particle diameter (μm) of the scattering particles and the vertical axis indicates the particle density (W %) of the scattering particles.

The particle diameter and the particle density of the scattering particles need to be confined within an area determined by the six points illustrated in each of FIGS. 9, 10A, 10B, 11A and 11B because a higher particle density outside the area fails to achieve a high-in-the-middle distribution as in the case of the flat light guide plate while a lower particle density outside the area fails to yield a light use efficiency of 55% or greater as light is allowed to pass through, whereas scattering particles having a smaller diameter outside the area improves the light use efficiency but fails to achieve a high-in-the-middle distribution while scattering particles having a greater diameter outside the area achieves a high-in-the-middle distribution but only yields a low light use efficiency.

Thus, selection of an appropriate particle density of the scattering particles from within a particle diameter range determined as mentioned above enables emission of light with an increased light use efficiency as compared with cases where the scattering particles are dispersed in the flat light guide plate. The embodiment achieves a light use efficiency of at least 55%, specifically 70% or greater.

Thus, selection of an appropriate combination of particle diameter and particle density ensures that light from the LED light source is emitted from the light guide plate free from uneven brightness with a light mixing distance of about 10 mm.

The light guide plate 30 having scattering particles dispersed therein needs to meet a light use efficiency of at least 55%, the light use efficiency indicating a ratio of light emitted through the light exit plane to light admitted through the two light entrance planes. This is because under a light use efficiency of 55%, a light source capable of generating a greater output is needed to obtain a required brightness, and a light source capable of generating a greater output not only assumes a higher temperature and consumes a greater amount of electricity but causes the light guide plate 30 to warp or expand in a significant manner, making it impossible to achieve a required brightness distribution, i.e., a high-in-the-middle or bell-curve brightness distribution.

Further, the middle-high ratio represented by the brightness distribution as measured at the light exit plane indicating the ratio of brightness of the light emitted from an area about the center of the light exit plane to the brightness of the light emitted from areas of the light exit plane close to the light entrance planes needs to be 0% exclusive to 25% inclusive. This is because a distribution meeting such a condition is the brightness distribution required of a thin, large-screen liquid crystal television, i.e., a high-in-the-middle, bell-curve distribution whereby an area closer to the center of the screen is bright as compared with the periphery thereof.

The light guide plate 30 having such a property may be manufactured by using an extrusion molding or an injection molding.

In the light guide plate 30, at least one surface of the first light entrance plane 30d and the second light entrance plane 30e, through which light is admitted, the light exit plane 30a, and the first inclined plane 30b and the second inclined plane 30c, which reflect light, preferably has a surface roughness Ra of less than 380 nm, thus, Ra<380 nm.

When the first light entrance plane 30d and the second light entrance plane 30e, through which light is admitted, each have a surface roughness Ra of less than 380 nm, diffuse reflection on the surfaces of the light entrance planes can be ignored or, in other words, diffuse reflection on the surfaces of the light entrance planes can be prevented and, thus, light admission efficiency can be improved.

Further, when the light exit plane 30a is given a surface roughness Ra of less than 380 nm, transmission by diffuse reflection through the surface of the light exit plane can be ignored or, in other words, transmission by diffuse reflection on the surface of the light exit plane can be prevented and, therefore, light is allowed to travel further deep into the light guide plate by total reflection.

Further, when the first inclined plane 30b and the second inclined plane 30c, both serving to reflect light, is given a surface roughness Ra of less than 380 nm, diffuse reflection can be ignored or, in other words, diffuse reflection on these reflective surfaces can be prevented and, therefore, all the reflected light components are allowed to travel further deep into the light guide plate.

The light guide plate of the embodiment, basically configured as described above, may be designed as follows. Note that a light guide plate used to describe a design method do not have holes for connecting the light guide plate to the upper housing 44 and the lower housing 42 of the housing 40. However, the holes are made in limited areas of the light guide plate such that basically the same light will be emitted through the light exit plane.

Figure 12:
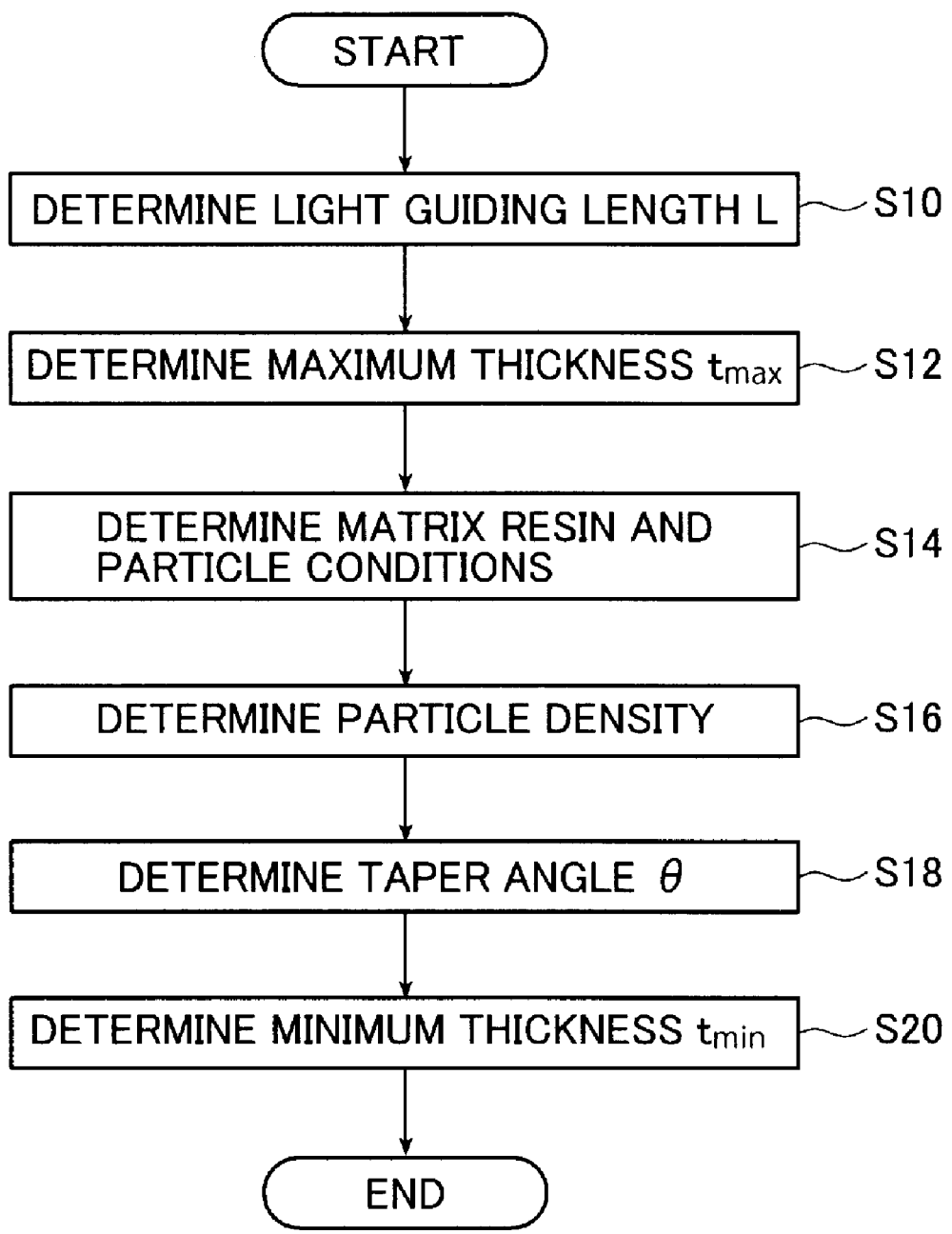
FIG. 12 is a flowchart illustrating designing method of the light guide plate according to Embodiment 1 of the invention.

FIG. 12 is a flowchart illustrating an example of a method for designing the light guide plate of the invention.

As illustrated in FIG. 12, a light guiding length is determined in Step S10 by adding a light mixing distance of about 10 mm to the length of the shorter side of the screen size of the liquid crystal display device to which the backlight unit using the inventive light guide plate is applied.

Next, a maximum thickness $t_{max}$ of the light guide plate is determined from the screen size in Step S12.

Then, a matrix resin used for the light guide plate and particle conditions of the added scattering particles are determined in Step S14.

Then, a particle density is determined in Step S16 that yields a light use efficiency of 55% or greater with the flat light guide plate containing scattering particles dispersed therein (dispersing light guide plate) and having the light guiding length determined earlier. The light use efficiency is expressed as $E=I_{out}/I_{in}\times 100$ [%], where $I_{out}$ and $I_{in}$ denote outgoing and incoming luminous fluxes [lm], respectively. While the particle density is determined by simulation, when there is a difference between a light use efficiency E as actually measured and a light use efficiency E as obtained by simulation, the design value of the particle density should be determined considering the difference. When there is such a difference, it is preferable to have previously found the difference between a light use efficiency E as actually measured and a light use efficiency E as obtained by simulation.

Next, in Step S18, the taper angle θ or the maximum thickness $t_{max}$ of the inclined rear planes (reversed wedge shape) of the inventive light guide plate is varied, with the design value of the particle density fixed, to obtain a brightness distribution at the light exit plane of the light guide plate and determine the taper angle θ whereby the middle-high ratio represented by the brightness distribution thus obtained falls within a given range. At this time, the radius of curvature Rr of the curved portion at the center is determined according to the light guiding length to match with the tapered planes. The middle-high ratio D is expressed as $0 \leq D \leq 25$, $D=[(L_{cen}-L_{edg})/L_{cen}]\times 100$ [%]. The middle-high ratio D denotes a middle-high ratio represented by the brightness distribution (a degree to which the middle stands out), and $L_{cen}$ and $L_{edg}$ denote brightnesses as observed at about the center and at both sides of the screen (areas close to the entrance planes), respectively. While the taper angle θ is determined by simulation, when there is a difference between a particle density as actually measured and a particle density as obtained by simulation, the brightness distribution should be considered and the ratio D determined taking into account the difference to determine the taper angle θ. When there is such a difference, it is preferable to have previously found the difference between a particle density as actually measured and a particle density as obtained by simulation is preferably obtained.

Subsequently, in Step S20, a thickness at positions at which light is admitted (minimum thickness) $t_{min}$ is determined from the relationship between the maximum thickness of the light guide plate $t_{max}$ on the one hand and the taper (taper angle) and the radius of curvature Rr of the curved portion at the center on the other to select LEDs having a light emission face smaller than the thus determined thickness $t_{min}$ at positions at which light is admitted.

The light guide plate of the embodiment can be designed following the procedure described above.

Figure 13:
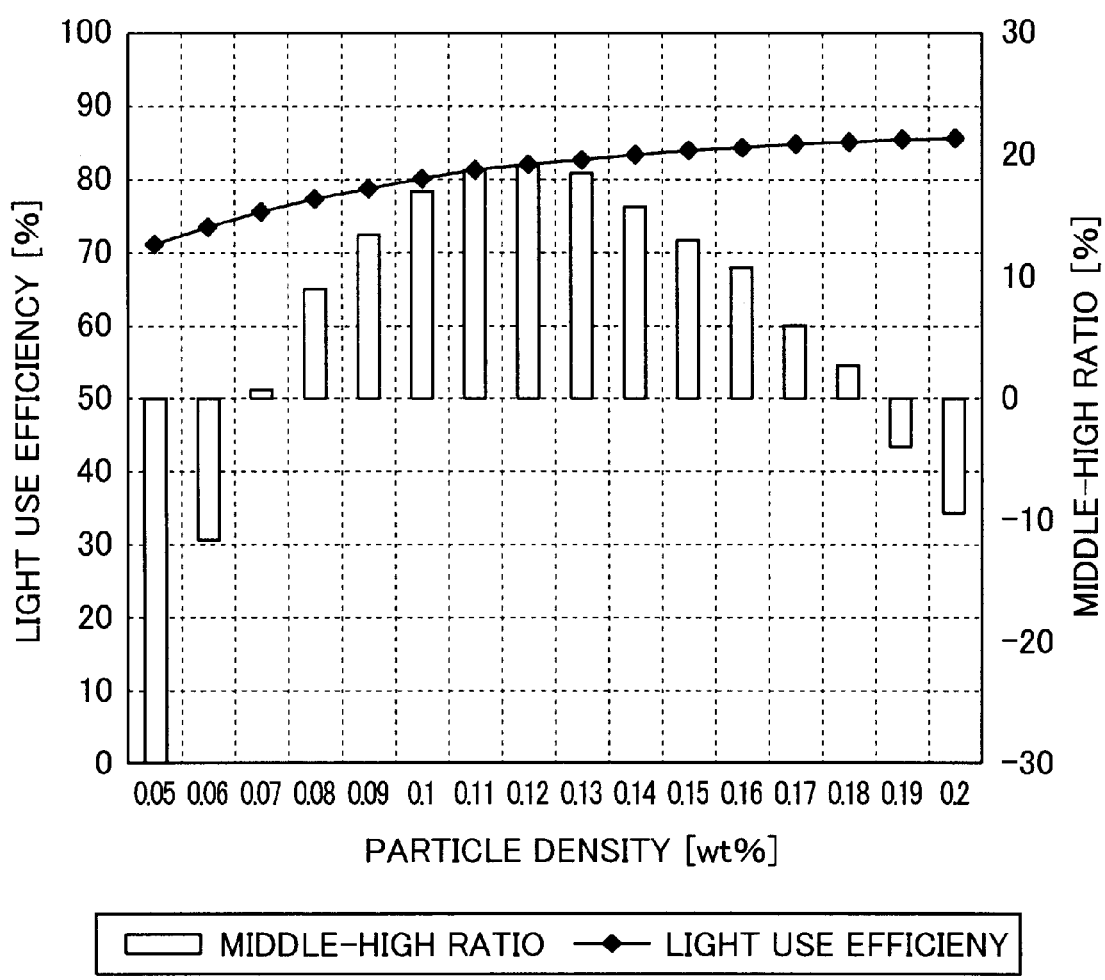
FIG. 13 is a graph illustrating a relationship between density of particles dispersed in the light guide plate according to Embodiment 1 of the invention and light use efficiency on the one hand and middle-high ratio on the other hand.

FIG. 13 illustrates a relationship between particle density [wt %] on the one hand and a light use efficiency [%] and the middle-high ratio [%] on the other in the case of a light guide plate used for a screen size of 37 inches and having a maximum thickness of 3.5 mm and a light guiding length of 480 mm.

As is apparent from the drawing, the light use efficiency is greater than 70% in a particle density range of 0.05 wt % to 0.2 wt % while the middle-high ratio is negative, indicating that the brightness distribution is low in the middle, in particle density ranges of 0.05 wt % to 0.07 wt % and 0.19 wt % to 0.2 wt %. It will be understood that when the middle-high ratio of 10% or greater is required, for example, design should be made such that the particle density falls within a range of 0.08 wt % to 0.16 wt %.

Table 3 shows light guiding length [mm], maximum thickness [mm], particle density [wt %], taper angle θ [°], radius of curvature Rr of the central curved portion [mm], light use efficiency [%], and the middle-high ratio [%] of light guide plates designed as described above for screen sizes of 37 inches, 42 inches, 46 inches, 52 inches, 57 inches, and 65 inches, respectively.

TABLE 3

| Screen size | 37" | 42" | 46" | 52" | 57" | 65" |
| --- | --- | --- | --- | --- | --- | --- |
| Light guiding length [mm] | 480 | 560 | 590 | 660 | 730 | 830 |
| Maximum thickness [mm] | 3.48 | 3.48 | 3.48 | 3.5 | 3.48 | 3.48 |
| Particle density [wt %] | 0.065 | 0.048 | 0.043 | 0.035 | 0.028 | 0.022 |
| Taper angle θ [°] | 0.00477 | 0.00411 | 0.0039 | 0.00351 | 0.00317 | 0.00279 |
| Radius of curvature Rr [mm] | 15000 | 20000 | 22000 | 28000 | 33000 | 42000 |
| Light use efficiency [%] | 61.5 | 61 | 61 | 60 | 61 | 59 |
| Middle-high ratio [%] | 19 | 15 | 14.5 | 14 | 14.2 | 13.5 |

Any of the light guide plates given in Table 3, meeting the ranges as provided by the embodiment, is thin despite of its large screen, yields a high light use efficiency, emits light with minimized unevenness in brightness and achieves a high-in-the-middle or bell-curve distribution whereby an area about the center of the screen is brighter than the periphery, as is required of thin, large-screen liquid crystal televisions.

The light guide plate of the embodiment is basically configured as above.

Next, the optical member unit 32 will be described.

The optical member unit 32 serves to reduce the brightness unevenness of the illumination light emitted through the light exit plane 30a of the light guide plate 30 to achieve emission of light with reduced brightness unevenness through a light emission plane 24a of the main body of the lighting device 24. As illustrated in FIG. 2, the optical member unit 32 comprises a diffusion sheet 32a for diffusing the illumination light emitted through the light exit plane 30a of the light guide plate 30 to reduce brightness unevenness, a prism sheet 32b having micro prism arrays formed parallel to the lines where the light exit plane and the light entrance planes meet, and a diffusion sheet 32c for diffusing the illumination light emitted through the prism sheet 32b to reduce brightness unevenness.

Preferably, the optical member unit 32 has similar circular holes and long holes in positions corresponding to the first circular hole 60a, the second circular hole 60c, the first long hole 62a, and the second long hole 62c made in the light exit plane 30a of the light guide plate 30 to secure the light source 28 and the light guide plate 30 to the holder member 31a. To connect the light guide plate 30 to the upper housing 44 and the lower housing 42 of the housing 40, the optical member unit 32 preferably has similar circular holes and long holes, though not shown, in positions corresponding to the third circular hole 61a, and the third long hole 63a made in the light exit plane 30a of the light guide plate 30.

The diffusion sheets 32a and 32c and the prism sheet 32b may be provided by making use, for example, of the diffusion sheets and the prism sheets disclosed in paragraphs 0028 through 0033 of JP 2005-234397 A filed by the same applicant as the present application.

While the optical member unit in the embodiment under discussion comprises the two diffusion sheets 32a and 32c and the prism sheet 32b between the two diffusion sheets, there is no specific limitation to the order in which the prism sheet and the diffusion sheets are arranged or the number thereof to be provided. Nor are the prism sheet and the diffusion sheets specifically limited, and use may be made of various optical members, provided that they are capable of reducing the brightness unevenness of the illumination light emitted through the light exit plane 30a of the light guide plate 30.

For example, the optical members may also be formed of transmittance adjusting members each comprising a number of transmittance adjusters consisting of diffusion reflectors distributed according to the brightness unevenness in addition to or in place of the diffusion sheets and the prism sheet described above.

Now, the reflection plate 34 of the main body of the lighting device will be described.

The reflection plate 34 is provided to reflect light leaking through the first inclined plane 30b and the second inclined plane 30c of the light guide plate 30 back into the light guide plate 30 and helps enhance the light use efficiency. The reflection plate 34 is shaped according to the contour of the first inclined plane 30b and the second inclined plane 30c of the light guide plate 30 to cover the first inclined plane 30b and the second inclined plane 30c. In the embodiment under discussion, the reflection plate 34 is shaped to contour a triangular shape in section formed by the first inclined plane 30b and the second inclined plane 30c as illustrated in FIG. 2.

The reflection plate 34 may be formed of any material as desired, provided that it is capable of reflecting light leaking through the inclined planes of the light guide plate 30. The reflection plate 34 may be formed, for example, of a resin sheet produced by kneading, for example, PET or PP (polypropylene) with a filler and then drawing the resultant mixture to form voids therein for increased reflectance; a sheet with a specular surface formed by, for example, depositing aluminum vapor on the surface of a transparent or white resin sheet; a metal foil such as an aluminum foil or a resin sheet carrying a metal foil; or a thin sheet metal having a sufficient reflective property on the surface.

Upper light guide reflection plates 36 are disposed in the respective holder members 31a between the light guide plate 30 and the diffusion sheet 32a, on the side of the light guide plate 30 closer to the light exit plane 30a, covering the end portions of the light sources 28 and the light exit plane 30a, i.e., the end portion thereof closer to the first light entrance plane 30d and the end portion thereof closer to the second light entrance plane 30e. Thus, the upper light guide reflection plates 36 are disposed to cover an area extending from part of the light exit plane 30a of the light guide plate 30 to part of the array bases 54 of the light sources 28 in a direction parallel to the direction of the optical axis. Briefly, two upper light guide reflection plates 36 are disposed respectively at both end portions of the light guide plate 30.

The upper light guide reflection plates 36 thus provided prevent light emitted by the light sources 28 from leaking toward the light exit plane 30a instead of entering the light guide plate 30.

Thus, light emitted from the LED chips 50 of the light sources 28 is efficiently admitted through the first light entrance plane 30d and the second light entrance plane 30e of the light guide plate 30, increasing the light use efficiency.

The lower light guide reflection plates 38 are provided on the side of the light guide plate 30 opposite from the light exit plane 30a, i.e., on the same side as the first inclined plane 30b and the second inclined plane 30c and extend into the holder member 31a to cover part of the light sources 28. The ends of the lower light guide reflection plates 38 closer to the center of the light guide plate 30 are connected to the reflection plate 34.

The lower light guide reflection plates 38 prevent light emitted by the light sources 28 from leaking toward the first inclined plane 30b and the second inclined plane 30c of the light guide plate 30 instead of entering the light guide plate 30.

Thus, light emitted from the LED chips 50 of the light sources 28 is efficiently admitted through the first light entrance plane 30d and the second light entrance plane 30e of the light guide plate 30, increasing the light use efficiency.

The upper light guide reflection plates 36 and the lower light guide reflection plates 38 may be formed of any of the above-mentioned materials used to form the reflection plate 34.

While the reflection plate 34 is connected to the lower light guide reflection plates 38 in the embodiment under discussion, their configuration is not so limited; they may be formed of separate materials.

The upper guide reflection plates 36 and the lower light guide reflection plates 38 include similar circular holes and long holes in positions corresponding to the first circular holes 60a and 60b, the second circular holes 60c and 60d, the first long holes 62a and 62b, and the second long holes 62c and 62d made in the light exit plane 30a of the light guide plate 30 to secure the upper guide reflection plates 36 and the lower light guide reflection plates 38 to the respective holder members 31a provided to integrate the light source 28 and the light guide plate 30. The upper guide reflection plates 36 and the lower light guide reflection plates 38 include similar circular holes and long holes, though not shown, in positions corresponding to the third circular hole 61a, and the third long hole 63a disposed in the light exit plane 30a of the light guide plate 30 to connect the light guide plate 30 to the upper housing 44 and the lower housing 42 of the housing 40.

The shapes and the widths of the upper light guide reflection plates 36 and the lower light guide reflection plates 38 are not limited specifically, provided that light emitted by the light sources 28 is reflected and directed toward the first light entrance plane 30d or the second light entrance plane 30e such that light emitted by the light sources 28 can be admitted through the first light entrance plane 30d or the second light entrance plane 30e and then guided toward the center of the light guide plate 30.

While, in the embodiment under discussion, the upper light guide reflection plates 36 are disposed between the light guide plate 30 and the diffusion sheet 32a, the location of the upper light guide reflection plates 36 is not so limited; each of them may be disposed between the sheets constituting the optical member unit 32 or between the optical member unit 32 and the holder member 31a.

Next, the holder means 31 will be described.

The holder means 31 includes the holder member 31a for securing and integrating the light source 28 and the light guide plate 30, the screws 31b and 31c for securing the light source 28 to the holder member 31a, and fastener pins 31d and 31e for securing the light guide plate 30 to the holder member 31a.

The holder member 31a secures and integrates the light source 28 and the light guide plate 30 by keeping the optical axis distance and the optical axis vertical distance between them constant, and absorbs the expansion and contraction of the light guide plate 30 perpendicular to the optical axis direction. The holder member 31a is a columnar member having a U-shaped sectional profile.

The holder member 31a is in a sliding contact with the upper housing 44 and the lower housing 42, thereby preventing a warp of the light guide plate 30 even when the light guide plate 30 expands/contracts in the direction perpendicular to the light entrance planes 30d and 30e of the light guide plate 30.

The frictional force generated in the contact surface increases with the area of contact between the holder member 31a and the upper housing 44 and the lower housing 42. The frictional force generated in the contact surface decreases with the contact area.

As illustrated in FIG. 3, the light source 28 is integrally secured to the holder means 31 by the screws 31b and 31c. The light guide plate 30, the optical member unit 32, and the reflection plate 34 are integrally secured to the holder means 31 by the fastener pins 31d and 31e.

Specifically, the light source 28 is positioned and secured to the holder member 31a as the screws 31b and 31c engage in the screw holes 52c and 52d and the screw holes of the holder member 31a.

The light guide plate 30 is positioned and secured to the holder members 31a on both sides of the first lateral plane 30f of the light guide plate 30 as the fastener pins 31d and 31e fitted in the engagement holes made in the holder members 31a fit in the first circular holes 60a and 60b and the second circular holes 60c and 60d respectively made in the light exit plane 30a and the rear plane of the light guide plate 30. Diameters of the first circular holes 60a and 60b and the second circular holes 60c and 60d are substantially equal to outer diameters of the fastener pins 31d and 31e. Thus, the light guide plate 30 is positioned by the holder member 31a on the side containing the first lateral plane 30f in both directions perpendicular and parallel to the first light entrance plane 30d and the second light entrance plane 30e. Thus, the holder member 31a fastens and integrates the light source 28 and the light guide plate 30, thereby keeping constant the distance between the light emission plane of the light source 28 and the first light entrance plane 30d and the second light entrance plane 30e of the light guide plate 30.

On both sides of the second lateral plane 30g of the light guide plate 30, the fastener pins 31d and 31e fitted in the engagement holes made in the holder member 31a are inserted into the first long holes 62a and 62b and the second long holes 62c and 62d respectively made in the light exit plane 30a and the rear plane of the light guide plate 30. The first long holes 62a and 62b and the second long holes 62c and 62d are long in a direction parallel to the first light entrance plane 30d and the second light entrance plane 30e of the light guide plate 30, and the diameters thereof as measured in a direction perpendicular to the first light entrance plane 30d and the second light entrance plane 30e are substantially equal to the outer diameters of the fastener pins 31d and 31e. Thus, the fastener pins 31d and 31e are fixedly or immovably fitted in the first long holes 62a and 62b and the second long holes 62c and 62d, respectively, in the direction perpendicular to the first light entrance plane 30d and the second light entrance plane 30e of the light guide plate 30, and movably inserted in these holes in the parallel direction.

Thus, on both sides of the second lateral plane 30g, the light guide plate 30 is positioned and secured by the holder member 31a in the direction perpendicular to the first light entrance plane 30d and the second light entrance plane 30e. In the parallel direction, the light guide plate 30 is movable, i.e., not fixedly positioned by the holder member 31a.

Thus, the holder member 31a integrates and secures the light source 28 and the light guide plate 30 in the direction perpendicular to the first light entrance plane 30d and the second light entrance plane 30e of the light guide plate 30, thereby keeping constant the distance between the light exit plane of the light source 28 and the first light entrance plane 30d and the second light entrance plane 30e of the light guide plate 30.

The fastener pins 31d and 31e move (slide) in the first long holes 62a and 62b and the second long holes 62c and 62d in the direction parallel to the first light entrance plane 30d and the second light entrance plane 30e of the light guide plate 30 as the light guide plate 30 expands or contracts, thereby preventing a warp of the light guide plate 30 that might otherwise be caused by its expansion/contraction.

Thus, adjacent both sides of the light guide plate 30, the first lateral plane 30f and the second lateral plane 30g of the light guide plate 30, the holder member 31a integrates and fixes the light source 28 and the light guide plate 30, thereby keeping constant the distance between the light exit plane of the light source 28 and the first light entrance plane 30d and the second light entrance plane 30e of the light guide plate 30. Thus, the light sources 28 disposed opposite the first light entrance plane 30d and the second light entrance plane 30e are prevented from being destroyed by expansion/contraction of the light guide plate 30. Moreover, light admission efficiency of light emitted from the light sources 28 to the first light entrance plane 30d and the second light entrance plane 30e of the light guide plate 30 is prevented from being reduced.

Even though the light source 28 and the light guide plate 30 are thus fixed and integrated, when the light guide plate 30 expands or contracts in the direction parallel to the light entrance planes (30d and 30e) of the light guide plate 30, the positions of the fastener pins 31d and 31e move in the long holes in the longer axis direction according to the expansion/contraction of the light guide plate 30. Thus, the light guide plate 30 can freely expand or contract to suppress warp of the light guide plate 30, minimizing brightness unevenness of light emitted from the light guide plate 30.

Even when the light guide plate 30 is adapted to have greater dimensions, the light guide plate 30 is allowed to freely expand or contract in the direction parallel to the light entrance planes (30d and 30e) of the light guide plate, whereby a warp of the light guide plate 30 can be suppressed.

The circular holes and the long holes made in the optical member unit 32 and the reflection plate 34 (upper light guide reflection plates 38 and lower light guide reflection plates 36) corresponding to the circular holes 60a to 60d and the long holes 62a to 62d made in the light guide plate 30 are provided to pass the pins 31d and 31e for securing the holder member 31a, the light guide plate 30, the optical member unit 32, and the reflection plate 34.

The pair of circular holes 60a, 60b and the other pair of circular holes 60c, 60d are provided close to and inwardly of the corners 30i and 30k of the light guide plate 30, respectively. Thus, even when the liquid crystal display device 10 or the backlight unit 20 is installed with the direction parallel to the light entrance planes 30d and 30e vertically oriented, damage of the light guide plate 30 that might be caused by vertical displacement of the light guide plate 30 can be prevented.

This arrangement of the circular holes is in no way limitative. Damage to the light guide plate 30 can be prevented by arranging the circular holes in positions depending upon the arrangement and position of the liquid crystal display device 10, hence the backlight unit 20 such that the light guide plate 30 is not displaced.

According to the embodiment, the screw holes 52c and 52d are made in the two places of the top surface 52a and the bottom surface 52b of the light source support 52 of the light source 28 to secure the light source 28 and the holder member 31a. However, other arrangements and numbers of screw holes may be employed, provided that the light source 28 and the holder member 31a can be secured.

While the screws are used for securing the light source 28 and the holder member 31a according to the embodiment, fasteners for the light source 28 and the holder member 31a are not limited to the screws. Various known fasteners may be used. For example, the light source 28 and the holder member 31a may be secured by using adhesives. Thus, the structure can be simplified since there is no need to make any screw holes in the light source support 52.

The method for securing the light guide plate 30 and the holder member 31a is not limited to the circular holes and the pins. For example, in place of the circular holes and the pins, adhesives may be applied to areas adjacent the corners of the light exit plane 30a and the rear plane of the light guide plate 30 to secure the light guide plate 30 and the holder member 31a.

Next, the housing 40 will be described.

As illustrated in FIG. 2, the housing 40 accommodates and secures therein the main body of the lighting device 24 by holding it from above and both sides thereof, i.e., the light exit plane 24a and the first inclined plane 30b and the second inclined plane 30c of the light guide plate 30. The housing 40 includes the lower housing 42, the upper housing 44, and the reinforcing members 46.

The lower housing 42, is open at the top and has a configuration including a bottom section and lateral sections provided upright on the four sides of the bottom section. Briefly, it has substantially the shape of a rectangular box open on one side. As illustrated in FIG. 2, the bottom section and the lateral sections support the main body of the lighting device 24 placed therein from above on the underside and on the lateral sides and covers the faces of the main body of the lighting device 24 except the light exit plane 24a, i.e., the plane opposite from the light exit plane 24a of the main body of the lighting device 24 (rear side) and the lateral sections.

The upper housing 44 has the shape of a rectangular box; it has an opening at the top that is slightly smaller than the rectangular light exit plane 30a of the light guide plate 30 and which is the light exit plane 24a of the main body of the lighting device 24. The upper housing 44 is open on the bottom side.

As illustrated in FIG. 2, the upper housing 44 is placed from above the main body of the lighting device 24 and the lower housing 42, that is, from the light exit plane side, to cover the main body of the lighting device 24 and the lower housing 42, which holds the former, as well as four lateral sections of the lower housing 42.

The reinforcing member 46 is a bar-shaped member having a rectangular cross section and disposed between the upper housing 44 and the lower housing 42.

As illustrated in FIG. 2, the reinforcing member 46 is connected to the upper housing 44 and the lower housing 42 by screws 46a and 46b.

Thus providing the reinforcing members 46 between the lower housing 42 and the upper housing 44 increases the rigidity of the housing 40 and prevents the light guide plate 30 from warping due to expansion/contraction thereof. As a result, for example, light can be efficiently emitted without, or with minimized brightness unevenness. Further, even where the light guide plate used is liable to develop a warp, the warp can be corrected with an increased certainty or the warping of the light guide plate can be prevented with an increased certainty, thereby allowing light to be emitted through the light exit plane without brightness unevenness or with a greatly reduced level of brightness unevenness.

Securing the lower housing 42 and the upper housing 44 and the reinforcing member 46 by tightening the screws 46a and 46b generates stress for tightening the holder means 31, especially the holder member 31a, between the lower housing 42 and the upper housing 44.

The lower housing 42, the upper housing 42, and the reinforcing member 46 of the housing 40 may be formed of various materials including metals and resins. Note that the material preferably is lightweight and offers high rigidity.

Though not illustrated in FIGS. 2 and 3, the third circular hole 61a and the third long hole 63a are preferably provided near the three corners 30i, 30j, and 30k of the light guide plate 30, as illustrated in FIGS. 4A and 6, to connect the light guide plate 30 to the upper housing 44 and the lower housing 42 of the housing 40. As described above similar circular holes and long holes (not shown) are preferably made corresponding to the third circular hole 61a and the third long hole 63a of the light guide plate 30 in the optical member unit 32 which includes the diffusion sheet 32a, the prism sheet 32b, and the diffusion sheet 32c, and in the upper light guide reflection plates 36 and the lower light guide reflection plates 38. In the upper housing 44 and the lower housing 42 of the housing 40, circular holes (not shown) for securing pins are made in positions corresponding to the third circular hole 61a and the third long hole 63a of the light guide plate 30 housed therein. The third circular hole 61a and the third long hole 63a of the light guide plate 30, and the corresponding circular holes and longs holes of the optical member unit 32, the upper light guide reflection plates 36, and the lower light guide reflection plates 38 are fitted with pins (not shown) respectively having diameters substantially equal to the diameters of the their respective holes (shorter diameter in the case of long holes). Those pins are also fitted in the circular holes made in the upper housing 44 and the lower housing 42 of the housing 40.

The light guide plate 30 is immovably secured to the housing 40 by pins (not shown) fixed to the housing 40 and fitted in the circular hole 61a made in the corner 30i of the light guide plate 30.

The long hole 63a long in the direction parallel to the light entrance planes 30d and 30e is made in the corner 30j of the light guide plate 30, while no hole for connection with the housing 40 is made in the corner 30*l*. Thus, since the pin (not shown) fixed to the housing 40 and fitted in the long hole 63*a* is movable in the long hole 63*a* in the direction parallel to the light entrance planes 30*d* and 30*e*, the light guide plate 30 can move in the direction parallel to the light entrance planes 30*d* and 30*e* with respect to the housing 40 as it expands or contracts. Therefore, a warp that might otherwise be caused by expansion/contraction of the light guide plate 30 can be prevented.

Thus, the light guide plate 30 can be held expandable and contractible in the housing 40.

As described above, similar circular holes and long holes (not shown) are made corresponding to the third circular hole 61*a* and the third long hole 63*a* of the light guide plate 30 in the optical member unit 32 which includes the diffusion sheet 32*a*, the prism sheet 32*b* and the diffusion sheet 32*c*, and in the upper guide reflection plates 36 and the lower light guide reflection plates 38. Thus, even when the light guide plate 30 and the optical member unit 32 such as the diffusion sheet 32*a*, the prism sheet 32*b*, and the diffusion sheet 32*c* have different expansion/contraction rates, a holding mechanism capable of preventing any deflection and warp thereof is achieved.

As described above, the light guide plate 30 is secured to the housing 40 through the holder means 31 so that when the light guide plate 30 expands or contracts in the direction perpendicular to the light entrance planes 30*d* and 30*e* of the light guide plate 30, the holder member 31*a* can absorb the expansion/contraction of the light guide plate 30. According to this embodiment wherein the light guide plate support structure is configured as described above and wherein the light exit plane 30*a* of the light guide plate is an inwardly curved plane, a warp of the light guide plate 30 caused by its expansion/contraction in the direction perpendicular to the light entrance plane can be suppressed, and unevenness in brightness of light emitted from the light exit plane 30*a* of the light guide plate 30 can be suppressed. Moreover, since the light guide plate 30 can freely expand or contract in the direction perpendicular to the light entrance plane of the light guide plate 30 even in the case of a large light guide plate, brightness unevenness of light emitted from the light exit plane 30*a* of the light guide plate 30 can be suppressed.

The light guide plate 30 and the light source 28 are secured to the holder member 31*a* to keep constant the optical axis distance and the optical axis vertical distance between them. Thus, even when the holder member 31*a* slides, the optical axis distance between the light guide plate 30 and the light source 28 can be kept constant. Such a configuration prevents destruction of the light source that might occur should it be pressed by the light entrance planes 30*d* and 30*e* of the light guide plate 30 as the light guide plate 30 expands or contracts in the direction perpendicular to the light entrance planes and/or reduction of light admission efficiency of light emitted from the light source 28 to the light guide plate 30.

Now, a specific configuration (example) of a sliding mechanism according to Embodiment 1 will be described below. It allows the light sources to slide in a direction perpendicular to the light entrance plane of the light guide plate to absorb the expansion and contraction of the light guide plate along the length of the light sources.

Figure 14:
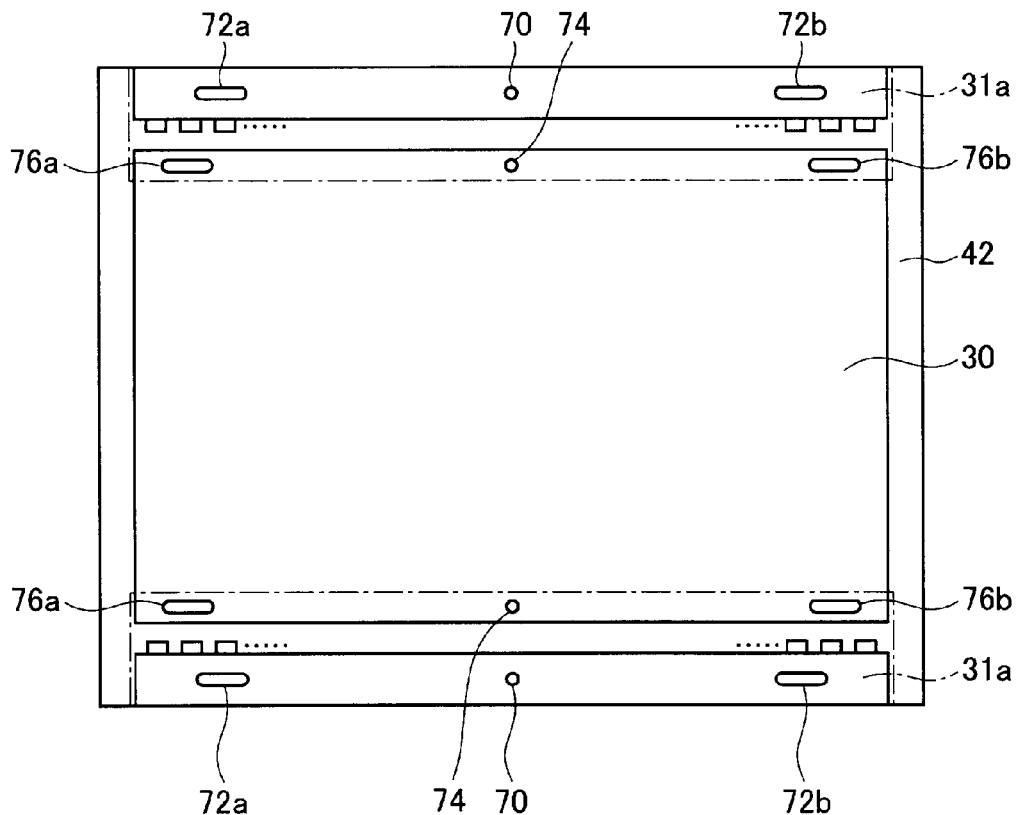
FIG. 14 is a top plan view illustrating the whole configuration of the planar lighting device comprising a sliding mechanism according to Embodiment 1 of the invention.

FIG. 14 is a front view illustrating the whole configuration (outline) of a planer lighting device according to Embodiment 1 comprising a sliding mechanism according to this embodiment. It is supposed in this embodiment that the lighting device is installed vertically.

Accordingly, the planar lighting device according to Embodiment 1 is suspended with its upper portion secured and has a main light source 28 at the top and bottom thereof as illustrated in FIG. 14.

In the planer lighting device according to this embodiment, the light guide plate 30 is so configured that the light guide plate 30 and the light source 28 freely expand and contract while keeping the optical axis distance and the optical axis vertical distance between them constant, and absorbs the expansion and contraction of the light guide plate 30 in the direction perpendicular thereto, that is, in the direction perpendicular to the light entrance plane.

Now, a more specific description will be made of a configuration for achieving the above effects.

In the planer lighting device according to this embodiment, pins (not shown) erected on the lower housing 42 engage in the circular hole 70 and the long holes 72*a*, 72*b* made respectively at the center and close to both ends of each of the light sources 28 disposed at the top and bottom of the lighting device made as illustrated in FIG. 14 to ensure that the light sources 28 disposed at the top and bottom can freely expand and contract evenly from the center defined by the circular hole 70 rightwards and leftwards in FIG. 14.

Similarly to the light sources 28, the light guide plate 30 may be so configured that pins (also not shown) erected on the lower housing 42 engage in the circular holes 74 and the long holes 76*a*, 76*b* made respectively at the center and close to both ends of the light guide plate 30.

As described earlier, the expansion and contraction of the light guide plate 30 in the vertical direction (in the direction of suspension) in FIG. 14 is absorbed inside the housing 40 through a holder means as illustrated in FIG. 2. Thus, no sliding mechanism acting in this direction is provided.

Figure 15:
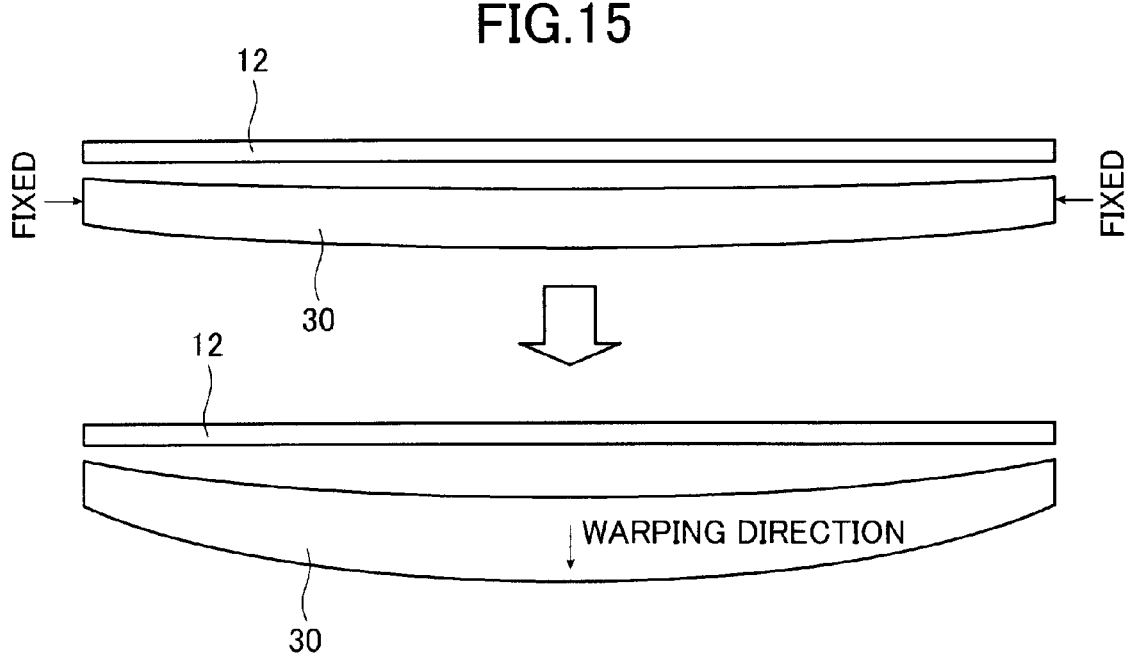
FIG. 15 is a view illustrating how the light guide plate of FIG. 14 warps (deforms).

Such a configuration ensures that, as illustrated in FIG. 15, after an ambient temperature rises as time passes from before the temperature rises (upper view in FIG. 15) until after the light sources 28 are turned on (start of operation of the planar lighting device) (lower figure in FIG. 15), the light guide plate 30 is allowed to warp to a side opposite from the light exit plane 30*a*, which in turn ensures that the light guide plate is prevented from warping (deforming) toward the liquid crystal display panel 12 to break the liquid crystal display panel 12.

The planar lighting device 10 of the embodiment further includes the heat sink 64 connected to the bottom portion of the sliding member holder 48*a* to absorb heat of the light source 28, and the heat pipe 66 disposed between the reflection plate 34 and the lower housing 42 and connected to the heat sink 64 to radiate heat.

The heat sink 64 absorbs heat radiated from the light source 28 through the sliding member holder 48*a* to radiate heat or conduct heat to the heat pipe 66.

The heat pipe 66 radiates the heat conducted from the heat sink 64 connected to one end of the heat pipe 66 from the other end thereof.

By disposing the heat sink 64 and the heat pipe 66, the heat generated from the light source 28 can be efficiently transferred to the heat pipe 66 and radiated therefrom. Thus, since the light source is cooled even when light emission efficiency of the light source is low, the amount of light emitted from the light source can be increased, thereby achieving a large backlight unit. Cooling of the light source can further increase the amount of light emitted from the light source, thereby achieving a large backlight unit.

The heat sink may be cooled by a method not limited to the air-cooling method; a water-cooling method can also be used.

The power unit casing 49 (see FIG. 1) for holding a power source (not shown) of the light source is attached to the underside of the lower housing 42.

The planar lighting device 20 is basically configured as described above.

In the planar lighting device 20, light emitted by the light sources 28 provided on both sides of the light guide plate 30 strikes the light entrance planes, i.e., the first light entrance plane 30d and the second light entrance plane 30e, of the light guide plate 30 while light emitted by the auxiliary light sources 29 provided on the other two sides of the light guide plate 30 strikes the lateral planes, i.e., the first auxiliary light entrance plane 30h and the second auxiliary light entrance plane 30i. Then, the light admitted through the respective planes is scattered by scatterers contained inside the light guide plate 30 as will be described later in detail as the light travels through the inside of the light guide plate 30 and, directly or after being reflected by the first inclined plane 30b or the second inclined plane 30c, exits through the light exit plane 30a. In the process, part of the light leaking through the first inclined plane 30b and the second inclined plane 30c is reflected by the reflection plate 34 to enter the light guide plate 30 again.

Thus, light emitted through the light exit plane 30a of the light guide plate 30 is transmitted through the optical member 32 and emitted through the light emission plane 24a of the main body of the lighting device 24 to illuminate the liquid crystal display panel 12.

The liquid crystal display panel 12 uses the drive unit 14 to control the transmittance of the light according to the position so as to display characters, figures, images, etc. on its surface.

Thus, the holder means 31 and the sliding mechanism provided in this embodiment prevent the light guide plate 30 from warping toward the light exit plane as a result of its possible expansion and contraction thereof, and unevenness in brightness of light emitted from the light exit plane 30a of the light guide plate 30 can be reduced.

Specifically, as illustrated in FIG. 7, in case the light guide plate 30 expands/contracts to develop a warp, the light exit plane 30a of the light guide plate 30 warps so as to curve toward the reflection plate 34 because the light guide plate 30 is adapted to have the inwardly curved light exit plane 30a curved toward the reflection plate (downward in the drawing). Accordingly, the light guide plate 30 warps away from the liquid crystal display panel, i.e., downward in the drawing, which prevents the light guide plate 30 from pushing up the liquid crystal display panel and thus prevents occurrence of uneven brightness in the light emitted from the liquid crystal display device in a more preferable manner.

The configuration according to the embodiment where the light exit plane 30a of the light guide plate is an inwardly curved plane curved toward the reflection plate 34 prevents the light exit plane from pushing up the liquid crystal display panel and thus prevents occurrence of uneven brightness that might be caused as the light guide plate touches the liquid crystal display panel should the light guide plate not be provided with the holder means and the sliding mechanism, although the distance between the light guide plate and the light sources then cannot be kept constant.

In the embodiment under discussion, the light exit plane 30a of the light guide plate 30 has the longer sides adjacent the light entrance planes and the shorter sides adjacent the lateral planes in order to emit light through the light exit plane with an enhanced brightness and efficiency. The invention, however, is not limited to such a configuration; the light exit plane may be formed into a square; or the sides thereof adjacent the light entrance planes may be the shorter sides and the sides thereof adjacent the lateral planes may be the longer sides.

The light guide plate may be fabricated by mixing a plasticizer into a transparent resin.

Fabricating the light guide plate from a material thus prepared by mixing a transparent material and a plasticizer provides a flexible light guide plate, allowing the light guide plate to be deformed into various shapes. Accordingly, the surface of the light guide plate can be formed into various curved surfaces.

Where the light guide plate is given such flexibility, the light guide plate or the planar lighting device using the light guide plate can even be mounted to a wall having a curvature when used, for example, for a display board employing ornamental lighting (illuminations). Accordingly, the light guide plate can be used for a wider variety of applications and in a wider application range including ornamental lighting and POP (point-of-purchase) advertising.

Said plasticizer is exemplified by phthalic acid esters, or, specifically, dimethyl phthalate, diethyl phthalate (DEP), dibutyl phthalate (DBP), di(2-ethylhexyl)phthalate (DOP (DEHP)), di-n-octyl phthalate (DnOP), diisononyl phthalate (DINP), dinonyl phthalate (DNP), diisodecyl phthalate (DIDP), phthalate mixed-base ester ($C_6$ to $C_{11}$) (610P, 711P, etc.) and butyl benzyl phthalate (BBP). Besides phthalic acid esters, said plasticizer is also exemplified by dioctyl adipate (DOA), diisononyl adipate (DINA), dinormal alkyl adipate ($C_{6,8,10}$) (610A), dialkyl adipate ($C_{7,9}$) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

Embodiment 2

Figure 16:
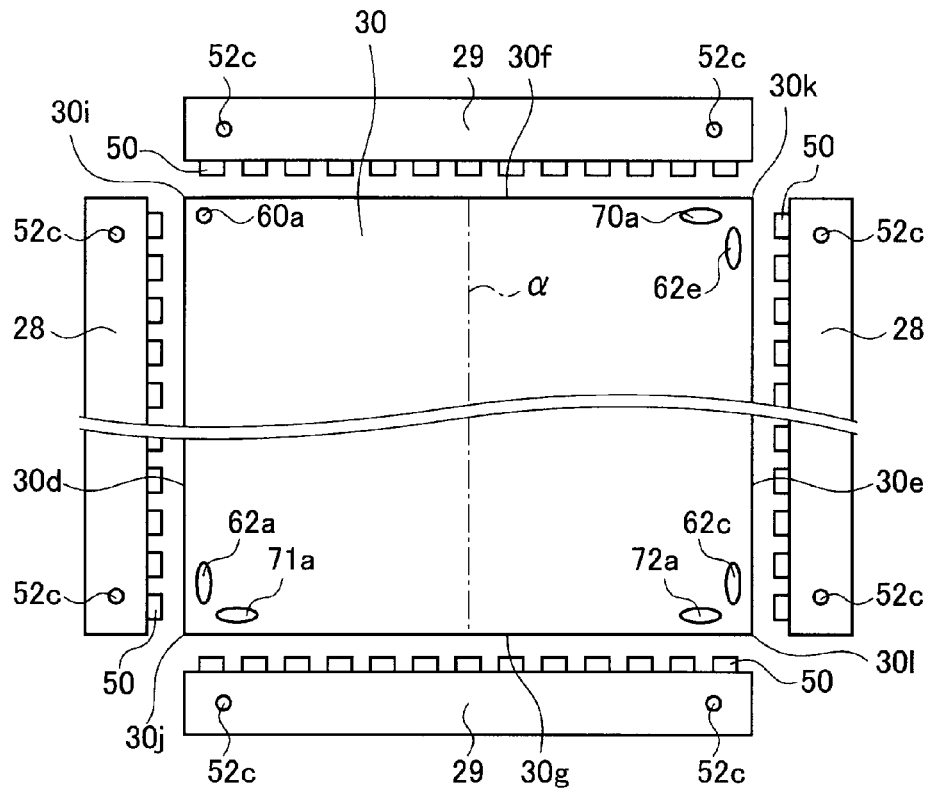
FIG. 16 is a schematic plan view illustrating a schematic configuration of the planar lighting device according to Embodiment 2 of the invention.

In Embodiment 1, the light sources 28 are disposed on only the surfaces opposite the light entrance planes 30d and 30e. However, this arrangement is in no way limitative of the present invention. As illustrated in FIG. 16, the light sources 28 disposed opposite the light entrance planes 30d and 30e may be provided as main light sources, and auxiliary light sources 29 may be disposed opposite the first lateral plane 30g and the second lateral plane 30f such that the first lateral plane 30g and the second lateral plane 30f may be provided respectively as a third light entrance plane and a fourth light entrance plane. Thus, brightness of light emitted through the light exit planes can be further enhanced.

Also when the auxiliary light source 29 is provided, the holder means 31 and the sliding mechanism 48 are provide as in the case of the light source 28 illustrated in FIG. 2, and screw holes 52c and 52d are made in a light source support 52 as illustrated in FIG. 16. To keep constant a distance between the light source 28 and the light entrance planes 30d and 30e of the light guide plate 30 and a distance between the auxiliary light source 29 and the light entrance planes 30f and 30g of the light guide plate 30, a first circular hole 60a, a first long hole 62a, and a second long hole 62c are made in the corners 30i, 30j, and 30l of the light exit plane 30a of the light guide plate 30, and a fifth long hole 62e substantially similar in shape to the first long hole 62a and the second long hole 62c is made in place of the second circular hole 60c made in the corner 30k of the light guide plate 30. In addition, a sixth long hole 70a, a seventh long hole 71a, and an eighth long hole 72a each having longer diameters in a direction orthogonal to the longer diameters of the first long hole 62a, the second long hole 62c, and the fifth long hole 62e are respectively made in the corners 30k, 30j, and 30l of the light guide plate 30. Thus, destruction of the main light sources 28 and the auxiliary light sources 29 caused by expansion/contraction of the light guide plate 30, a reduction of light admission efficiency to the light entrance planes by the main light sources 28 and the auxiliary light sources 29, brightness unevenness of light emitted from the light exit plane 30a can be prevented. Though not shown, circular holes and long holes are similarly made in the inclined planes 30b and 30c defining the rear planes of the light guide plate 30 in positions corresponding to the circular holes and the long holes made in the light exit plane 30a of the light guide plate 30.

In the example illustrated in FIG. 16, a third circular hole 61a, and a third long hole 63a, though not shown, may of course be made in the light guide plate 30 to connect the light guide plate 30 to the upper housing 44 and the lower housing 42 of the housing 40 as in the case of the examples illustrated in FIGS. 4A and 6. Although the third circular hole 61a, and the third long hole 63a illustrated in FIGS. 4A and 6 are through-holes, these holes may be two separate holes each made in the light exit plane 30a and the rear plane of the light guide plate 30.

The one circular hole 60a, six long holes 62a, 62c, 62e, 70a, 71a, and 72a described above and corresponding one circular hole and six long holes made in the rear plane are circular holes and long holes for securing the light guide plate 30 to the holder member 31a to integrate it with the main light sources 28 and the auxiliary light sources 29, and keeping constant the distance between the main light source 28 and the light entrance planes 30d and 30e of the light guide plate 30, and a distance between the auxiliary light source 29 and the light entrance planes obtained by substituting the light entrance planes 30f and 30g of the light guide plate 30. Thus, the circular holes and the long holes of the light exit plane 30a and the circular holes and the long holes of the rear plane may be through-holes, provided that they serve the above purpose.

Further, while each LED chip of the light sources is formed, for example, by applying YAG fluorescent substance to the light emission face of a blue LED, the LED chip may be formed otherwise without limitations to such a configuration. For example, the LED chip used herein may be formed using a different monochromatic LED such as a red LED or a green LED with a fluorescent substance.

Further, an LED unit formed using three kinds of LEDs, i.e., a red LED, a green LED, and a blue LED, may be used. In that case, light beams emitted by the three kinds of LEDs are blended to produce white light.

Alternatively, a semiconductor laser (LD) may be used instead of an LED.

Further, one may provide between the light guide plate 30 and each of the light sources (main light sources 28 and/or auxiliary light sources 29) a portion formed of a material having a refractive index close to that of the light guide plate 30. Alternatively, part of the light entrance planes and/or the lateral planes of the light guide plate may be formed of a material having a smaller refractive index than the other parts.

Where the part through which light emitted by the light source is admitted is adapted to have a smaller refractive index than the other parts, light emitted by the light source can be admitted more efficiently, and the light use efficiency can be further enhanced.

Further, two or more light guide plates may be juxtaposed by connecting their lateral planes to provide a single light exit plane formed by a plurality of light guide plates. In that case, the auxiliary light sources may be provided only on the lateral planes of the outermost light guide plates.

Another Embodiment

In the planar lighting device of the invention, the members existent between the light sources and the housing are preferably placed in contact with each other via radiating grease provided between them. Accordingly, it is preferable that radiating grease is applied to, that is, a layer of heat dissipating grease is formed on, the contact surfaces of the members existent between the light sources and the housing.

Specifically, a radiating grease is preferably applied onto the contact surfaces between the light source supports of the light sources and the holder means, the contact surfaces between the members forming the holder means, and the contact surfaces between the holder means and the housing or the upper housing and the lower housing to place the members in contact with each other via the radiating grease.

Radiating grease used to that end may be, for example, silicon grease, silicon grease containing a metal filler, or the like.

Thus, the holder members can be supported in a slidable state while the heat of the light sources can be transmitted to the housing more easily by placing the members in contact with each other with radiating grease provided therebetween, thereby increasing a heat radiation efficiency of the entire device and preventing temperature rise of the light sources. Prevention of temperature rise of the light sources thus achieved in turn leads to increase in the light emission efficiency of the light sources.

Further, limitation of temperature rise of the light sources and prevention of decrease in the light emission efficiency of the LEDs thus achieved permit increasing the brightness of light emitted by consuming the same amount of electrical power, which in turn serves to lower the power consumption by the planar lighting device.

Still further, deformation of the light guide plate that might otherwise be caused by heating of the light sources can be prevented and, therefore, deformation of the device can be prevented, which in turn prevents otherwise possible deformation from exerting unnecessary force to the liquid crystal display panel, causing the panel to deform and develop white patches, etc. Further, suppression of warps thus achieved eliminates or minimizes the need to provide a space anticipating warps or cushioning material, thereby simplifying the configuration of the device to achieve a thinner design of the device.

Further, efficient heat radiation achieved eliminates or minimizes the need to provide expensive heat radiation means such as heat pipes, achieving an inexpensive device.

Further still, application of radiating grease also serves to allow the movable components to slide smoothly.

Preferably, the radiating grease has a thermal conductivity of at least 0.6 W/m·k. Preferably used is silicon grease, which has a thermal conductivity of 10 W/m·k and contains metallic particles dispersed therein such as silver particles.

Where the radiating grease having a thermal conductivity of at least 0.6 W/m·k is used, an efficient heat transmission is achieved. Further, use of grease containing metal particles dispersed therein permits efficient radiation of heat generated in the light sources even when the grease is applied in a thick layer.

The radiating grease preferably has a consistency of 300 to 400 both inclusive.

The consistency of at least 300 allows the radiating grease to be applied in a thin layer; the consistency not greater than 400 prevents decrease of mobility of the slidable components and, for example, enables movable members to be moved with a low resistance.

Preferably, the radiating grease is applied to the entire surface of each contact surface.

When the radiating grease is applied to the entire surface of each contact surface, the heat of the light sources can be transmitted to the housing more efficiently.

Since heat is transmitted through each contact surface, the radiating grease needs to be applied to at least part of each contact surface, but only partially applied grease not applied to the entire surface of each contact surface can also produce a certain degree of effects.

Now, as earlier described referring to FIG. 7, the light guide plate 30 may have another configuration such that the light exit plane 30a of the light guide plate 30 is a curved plane curved downwardly or curved toward the inclined planes (reflection plate 34) from the light entrance planes toward the center or, more specifically, the light exit plane 30a may be an arc in a plane perpendicular to the lines where the light entrance planes meet the light exit plane may be an arc.

Thus, in case the light guide plate 30 expands/contracts to develop a warp, the light exit plane 30a of the light guide plate 30 warps so as to curve toward the reflection plate 34 (downward in the drawing) when the light guide plate 30 is adapted to have the inwardly curved light exit plane 30a curved toward the reflection plate 34. Accordingly, the light guide plate 30 warps away from the liquid crystal display panel, i.e., downward in the drawing, which prevents the light guide plate 30 from pushing up the liquid crystal display panel and thus prevents occurrence of uneven brightness in the light emitted from the liquid crystal display device in a more preferable manner.

As has been described referring to various embodiments and examples, the invention achieves a planar lighting device having a thin shape, yielding a high light use efficiency, capable of emitting light with a minimized brightness unevenness, and providing a high-in-the-middle or bell-curve brightness distribution.

It is to be noted that the embodiments and examples given above are not limitative in any manner of the invention, and various modifications and improvements may be made without departing from the spirit of the present invention.

Examples

Now, description will be made in detail referring to specific examples.

An example of measurements now to be described used a planar lighting device illustrated in FIG. 2, wherein a radiating grease was applied in a thickness of 50 μm to 100 μm to the entire contact surface between the light sources 28 and the holder members 31a, the contact surface between the holder members 31a and the lower housing 42, the contact surface between the holder members 31a and the heat sinks 64, the contact surface between the heat sinks 64 and the lower housing 42, the contact surface between the heat sinks 64 and the heat pipes 66, and the entire contact surface between the heat pipes 66 and the lower housing 42. The application of the radiating grease was done on both sides of the light guide plate 30 where the two light entrance planes are located. The radiating grease used for the measurements was a heat radiating silicone oil compound (brand name) having a thermal conductivity of 0.84 W/m·k and a consistency of 300. The light source supports used were members in the form of a plate. The light guide plate used was one for a 52-inch planar lighting device. The planar lighting device was suspended such that one of the holder members 31a was located in an upper position and the other was located beneath in a lower position.

Using the planar lighting device configured as above, measurements were made of the temperature of the light sources 28, flatness of the light guide plate, and brightness of the light emitted through the light exit plane of the planar lighting device. For comparison, measurements were also made of the temperature of the light sources 28, flatness of the light guide plate and brightness of the light emitted through the light exit plane.

The temperature of the light sources was determined by placing a thermocouple at a longitudinal center of the light source support 50, 5 mm immediately below a position where the LED chips 50 are mounted to the upper light source 28.

Flatness of the light guide plate was determined by measuring the amount of deformation of the upper and lower frame portions of the planar lighting device in relation to a reference gage (right-angle gauge) using a three-dimensional vision measuring method.

Brightness of the light emitted through the light exit plane was determined by measuring the brightness at the center of the light exit plane with a brightness meter (brand name: spectroradiometer SR-3).

Figure 17:
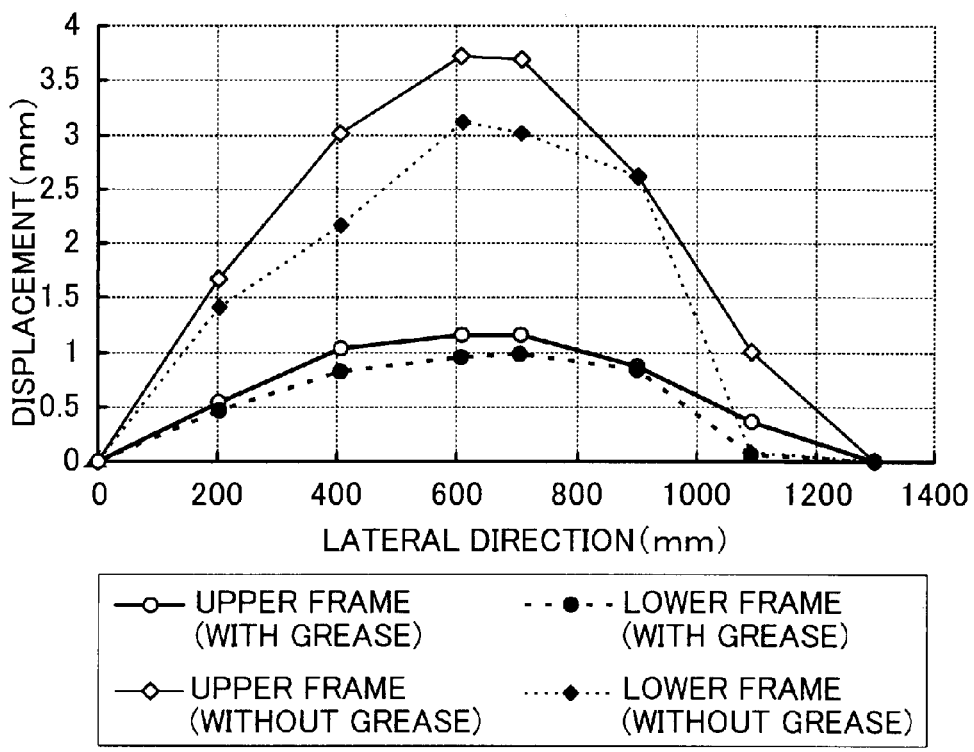
FIG. 17 is a graph illustrating measurements representing the flatness of a liquid crystal panel module used in the planar lighting device according to Embodiment 1 of the invention.
Figure 18:
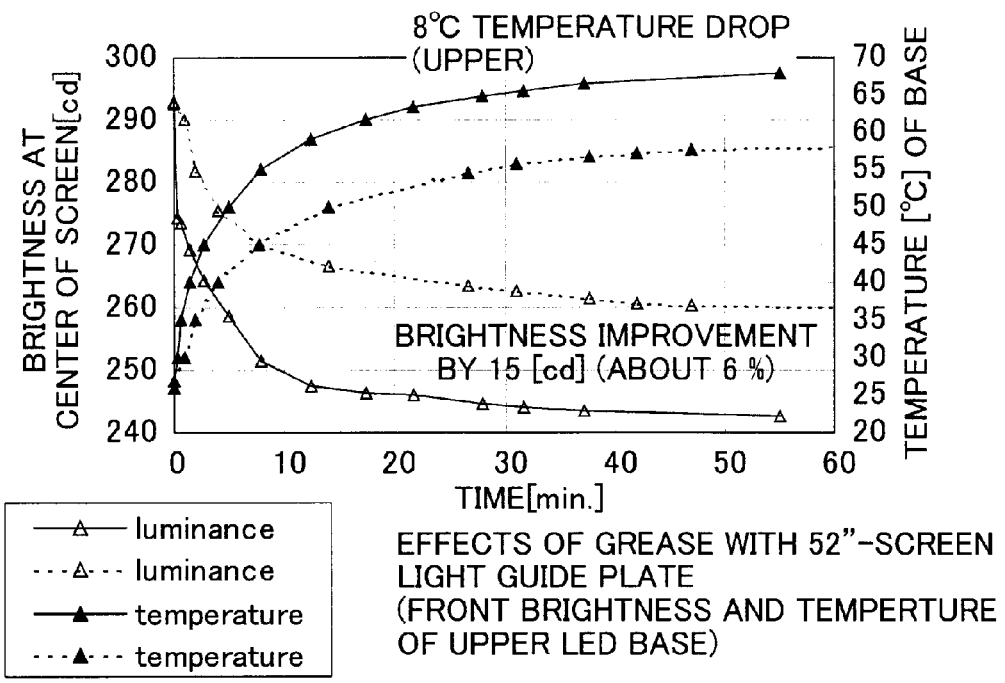
FIG. 18 is a graph illustrating relationships between elapsed time of illumination by the light sources in Embodiment 1 of the invention and the brightness at the center of the planar lighting device on the one hand and the temperature of the light sources on the other hand.
Figure 19:
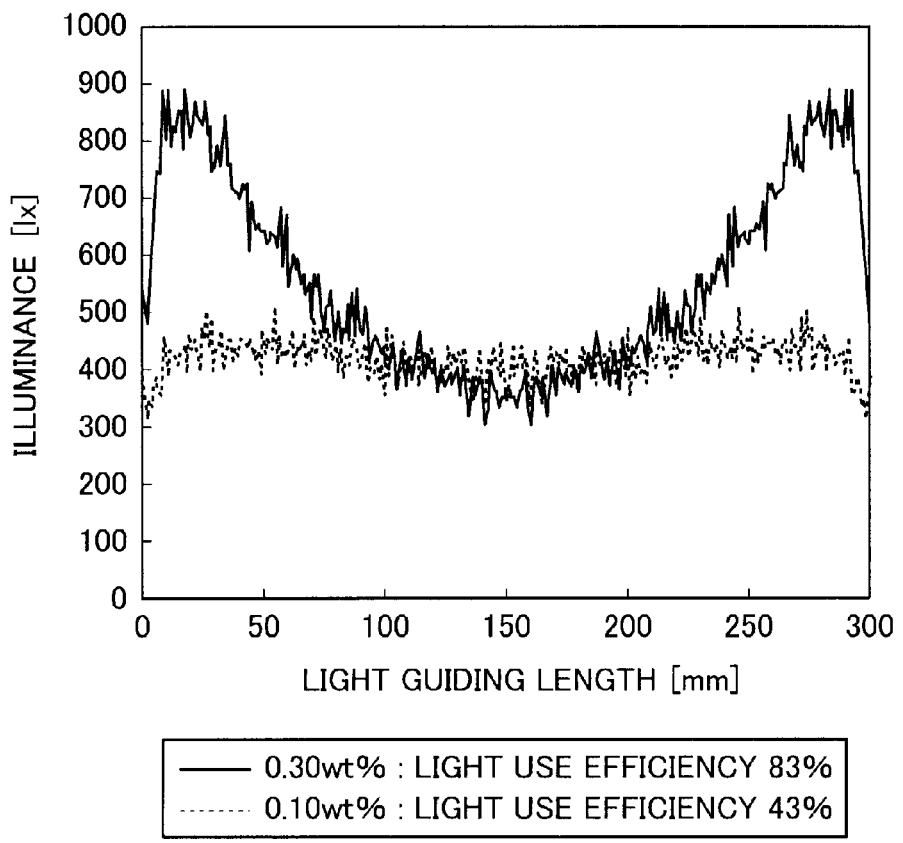
FIG. 19 is a graph illustrating an illuminance distribution of a conventional light guide plate as observed from the front thereof.

The measurements obtained are illustrated in FIGS. 17 and 18.

FIG. 17 is a graph illustrating measurements representing the flatness of a liquid crystal panel module; FIG. 18 is a graph illustrating measurements showing relationships between the length of time of illumination on the one hand and the temperature of the light sources and brightness of light emitted through the light exit plane on the other. In FIG. 17, the vertical axis indicates displacement, and the horizontal axis indicates the longitudinal direction of the upper and lower frames. In FIG. 18, the vertical axis indicates the temperature of the light source and brightness, and the horizontal axis indicates the length of time of illumination.

As illustrated in FIG. 17, in the case the radiating grease was not applied, a maximum displacement in the upper frame of the planar lighting device (indicated as "UPPER SIDE (WITHOUT GREASE)" in FIG. 17) was found to be 3.7 mm and a maximum displacement in the lower frame (indicated as "LOWER SIDE (WITHOUT GREASE)" in FIG. 17) was found to be 3.1 mm. In contrast, in the case the radiating grease was applied, a maximum displacement in the upper frame of the planar lighting device (indicated as "UPPER SIDE (WITH GREASE)" in FIG. 17) was found to be 1.2 mm and a maximum displacement in the lower frame (indicated as "LOWER SIDE (WITH GREASE)" in FIG. 17) was found to be 1.0 mm. This shows that application of the radiating grease reduces the displacement of the frames of the planar lighting device to one third as compared with the case the radiating grease was not applied.

From the foregoing, it is apparent that application of the radiating grease prevents deformation of the light guide plate and hence maintains the flatness thereof at a high level.

Further, FIG. 18 shows that in the case the radiating grease was applied, 55 minutes later, the temperature of the light source 28 was lower by 8° C. and the brightness improved by 15% as compared with the case the radiating grease was not applied.

The advantageous effects obtained according to the invention will be obvious from the foregoing description.

What is claimed is:

1. A planar lighting device comprising:
   a light guide plate including a concave rectangular light exit plane, two light entrance planes containing two opposite sides of the light exit plane and disposed opposite each other, two symmetrical inclined planes opposing to the light exit plane such that their distance from the light exit plane increases with the increasing distance from the two light entrance planes toward the center of the light exit plane, a curved portion connecting the two inclined planes, and light scattering particles for scattering light that propagates inside the light guide plate;

two light sources respectively disposed opposite the two light entrance planes for emitting light to enter the light into the light guide plate through the light entrance planes;

holder means for supporting and integrating each light source and the light guide plate while keeping their mutual distance constant;

a housing for accommodating the light sources and the light guide plate integrated by the holder means; and sliding mechanisms allowing the light sources to slide in a direction parallel to the light entrance planes of the light guide plate to absorb the expansion and contraction of the light sources along the length thereof, wherein the sliding mechanisms each comprise pins provided on the housing engaged in long holes formed in the light source so as to be long in the direction parallel to the light entrance planes.

2. The planar lighting device of claim 1, wherein the holder means integrates the light guide plate and the light sources without being affected by expansion and contraction of the light guide plate in a direction from the light entrance planes of the light guide plate toward the light sources.

3. The planar lighting device of claim 1, wherein the sliding mechanisms each further comprise another pin provided on the housing engaged in a circular hole formed at the center of the light source, the long holes being disposed on the sides of the circular hole, the light source being freely expand and contract evenly from the center defined by the circular hole.

4. The planar lighting device of claim 1, further comprising pins provided on the housing engaged in long holes formed in the light guide plate so as to be long in the direction parallel to the light entrance planes, the light guide plate being freely expand and contract in the direction parallel to the light entrance planes.

5. A planar lighting device comprising:

a light guide plate including a concave rectangular light exit plane, two light entrance planes containing two opposite sides of the light exit plane and disposed opposite each other, two symmetrical inclined planes opposing to the light exit plane such that their distance from the light exit plane increases such that their distance from the light exit plane increases with the increasing distance from the two light entrance planes toward the center of the light exit plane, a curved portion connection the two inclined planes, and light scattering particles for scattering light that propagates inside the light guide plate;

two light sources respectively disposed opposite the two light entrance planes for emitting light to enter the light into the light guide plate through the light entrance planes;

holder means for supporting and integrating each light source and the light guide plate while keeping their mutual distance constant, a housing for accommodating the light sources and the light guide plate integrated by the holder means; and sliding mechanisms allowing the light sources to slide in a direction parallel to the light entrance planes of the light guide plate to absorb the expansion and contraction of the light sources along the length thereof, wherein the light guide plate has a minimum thickness of 0.5 mm to 3.0 mm both inclusive at the light entrance planes, a maximum thickness of 1.0 mm to 6.0 mm both inclusive at a center of the curved portion, the curved portion having a radius of curvature of 1500 mm to 45000 mm both inclusive, the inclined planes each forming a taper angle of 0.1° to 2.2° both inclusive with respect to a line parallel to the light exit plane.

6. A planar lighting device comprising:

a light guide plate including a concave rectangular light exit plane, two light entrance planes containing two opposite sides of the light exit plane and disposed opposite each other, two symmetrical inclined planes opposing to the light exit plane such that their distance from the light exit plane increases with the increasing distance from the two light entrance planes toward the center of the light exit plane, a curved portion connecting the two inclined planes, and light scattering particles for scattering light that propagates inside the light guide plate;

two light sources respectively disposed opposite the two light entrance planes for emitting light to enter the light into the light guide plate through the light entrance planes;

holder means for supporting and integrating each light source and the light guide plate while keeping their mutual distance constant;

a housing for accommodating the light sources and the light guide plate integrated by the holder means; and sliding mechanisms allowing the light sources to slide in a direction parallel to the light entrance planes of the light guide plate to absorb the expansion and contraction of the light sources along the length thereof, wherein the light exit plane of the light guide plate is formed of a curved plane curved toward the inclined planes, and has a radius of curvature of 55000 mm to 120000 mm both inclusive, the curved portion having a radius of curvature of 10000 mm to 55000 mm both inclusive.

* * * * *